US010372904B2

(12) United States Patent
Hunt et al.

(10) Patent No.: US 10,372,904 B2
(45) Date of Patent: Aug. 6, 2019

(54) COST PRIORITIZED EVALUATIONS OF INDICATORS OF COMPROMISE

(71) Applicant: Tanium Inc., Emeryville, CA (US)

(72) Inventors: Christian L. Hunt, Chapel Hill, NC (US); Thomas R. Gissel, Apex, NC (US); Thomas W. Savage, Birmingham, AL (US)

(73) Assignee: TANIUM INC., Emeryville, CA (US)

( * ) Notice: Subject to any disclaimer, the term of this patent is extended or adjusted under 35 U.S.C. 154(b) by 294 days.

(21) Appl. No.: 15/215,468

(22) Filed: Jul. 20, 2016

(65) Prior Publication Data

US 2017/0264627 A1 Sep. 14, 2017

Related U.S. Application Data

(60) Provisional application No. 62/305,482, filed on Mar. 8, 2016, provisional application No. 62/333,768, filed on May 9, 2016.

(51) Int. Cl.
*H04L 29/06* (2006.01)
*G06F 21/55* (2013.01)
(Continued)

(52) U.S. Cl.
CPC .......... *G06F 21/554* (2013.01); *G06F 21/552* (2013.01); *G06F 21/577* (2013.01);
(Continued)

(58) Field of Classification Search
CPC . H04L 43/10; H04L 63/1408; H04L 63/1441; H04L 67/141; H04L 63/1425;
(Continued)

(56) References Cited

U.S. PATENT DOCUMENTS 5,220,596 A 6/1993 Patel
5,842,202 A 11/1998 Kon
(Continued)

FOREIGN PATENT DOCUMENTS

EP 1553747 A1 7/2005
EP 2493118 A1 8/2012

OTHER PUBLICATIONS

Hood, Proactive Network-Fault Detection, Sep. 1997, 9 pages.
(Continued)

*Primary Examiner* — Amir Mehrmanesh
(74) *Attorney, Agent, or Firm* — Morgan, Lewis & Bockius LLP

(57) ABSTRACT

A method for evaluating indicators of compromise (IOCs) is performed at a device having one or more processors and memory. The method includes receiving respective specifications of a plurality of IOCs, wherein the respective specifications of each IOC of the plurality of IOCs includes a respective cost associated with evaluating the IOC. The method further includes dynamically determining an order for evaluating the plurality of IOCs based on the respective costs associated with the plurality of IOCs, and determining whether a threat is present based on results for evaluating one or more of the plurality of IOCs in accordance with the dynamically determined order, instead of an order by which the plurality of IOCs have been received at the device.

36 Claims, 13 Drawing Sheets

(51) Int. Cl.
*H04L 12/26* (2006.01)
*H04L 29/08* (2006.01)
*G06F 21/57* (2013.01)

(52) U.S. Cl.
CPC .......... *H04L 43/10* (2013.01); *H04L 63/1408* (2013.01); *H04L 63/1425* (2013.01); *H04L 63/1441* (2013.01); *H04L 67/141* (2013.01); *G06F 2221/034* (2013.01)

(58) Field of Classification Search
CPC ................. G06F 21/552; G06F 21/554; G06F 2221/034; G06F 21/577
See application file for complete search history.

(56) References Cited

U.S. PATENT DOCUMENTS

| | | | |
|---|---|---|---|
| 6,049,828 | A | 4/2000 | Dev et al. |
| 6,879,979 | B2 | 4/2005 | Hindawi et al. |
| 7,240,044 | B2 | 7/2007 | Chaudhuri et al. |
| 7,299,047 | B2 | 11/2007 | Dolan et al. |
| 7,555,545 | B2 | 6/2009 | McCasland |
| 7,600,018 | B2 | 10/2009 | Maekawa et al. |
| 7,698,453 | B2 | 4/2010 | Samuels et al. |
| 7,720,641 | B2 | 5/2010 | Alagappan et al. |
| 7,761,557 | B2 | 7/2010 | Fellenstein et al. |
| 7,844,687 | B1 | 11/2010 | Gelvin et al. |
| 8,078,668 | B2 | 12/2011 | Moreau |
| 8,139,508 | B1 | 3/2012 | Roskind |
| 8,185,612 | B1 | 5/2012 | Arolovitch |
| 8,185,615 | B1 | 5/2012 | McDysan et al. |
| 8,271,522 | B2 | 9/2012 | Mehul et al. |
| 8,392,530 | B1 | 3/2013 | Manapragada |
| 8,477,660 | B2 | 7/2013 | Lee et al. |
| 8,504,879 | B2 | 8/2013 | Poletto et al. |
| 8,510,562 | B2 | 8/2013 | Ramakrishnan |
| 8,813,228 | B2 * | 8/2014 | Magee .................. G06F 21/577 713/187 |
| 8,885,521 | B2 | 11/2014 | Wang et al. |
| 8,903,973 | B1 | 12/2014 | Hindawi et al. |
| 8,904,039 | B1 | 12/2014 | Hindawi et al. |
| 9,009,827 | B1 * | 4/2015 | Albertson ............... H04L 63/14 726/22 |
| 9,059,961 | B2 | 6/2015 | Hindawi et al. |
| 9,609,007 | B1 * | 3/2017 | Rivlin ................. H04L 63/1416 |
| 9,667,738 | B2 | 5/2017 | Hindawi et al. |
| 9,769,037 | B2 | 9/2017 | Hindawi et al. |
| 9,985,982 | B1 * | 5/2018 | Bartos ................. H04L 63/1425 |
| 10,095,864 | B2 | 10/2018 | Hunt et al. |
| 2001/0056461 | A1 | 12/2001 | Kampe et al. |
| 2002/0007404 | A1 | 1/2002 | Vange et al. |
| 2002/0042693 | A1 | 4/2002 | Kampe et al. |
| 2002/0073086 | A1 | 6/2002 | Thompson et al. |
| 2002/0198867 | A1 | 12/2002 | Lohman et al. |
| 2003/0101253 | A1 | 5/2003 | Saito et al. |
| 2003/0131044 | A1 | 7/2003 | Nagendra et al. |
| 2003/0212676 | A1 | 11/2003 | Bruce et al. |
| 2003/0212821 | A1 | 11/2003 | Gillies et al. |
| 2004/0076164 | A1 | 4/2004 | Vanderveen et al. |
| 2004/0190085 | A1 | 9/2004 | Silverbrook et al. |
| 2005/0004907 | A1 | 1/2005 | Bruno et al. |
| 2005/0108356 | A1 | 5/2005 | Rosu |
| 2005/0108389 | A1 | 5/2005 | Kempin et al. |
| 2005/0195755 | A1 | 9/2005 | Senta et al. |
| 2006/0039371 | A1 | 2/2006 | Castro et al. |
| 2006/0128406 | A1 * | 6/2006 | Macartney .......... H04L 63/1416 455/466 |
| 2007/0005738 | A1 | 1/2007 | Alexion-Tiernan et al. |
| 2007/0211651 | A1 | 9/2007 | Ahmed et al. |
| 2007/0230482 | A1 | 10/2007 | Shim et al. |
| 2008/0082628 | A1 | 4/2008 | Rowstron et al. |
| 2008/0133582 | A1 | 6/2008 | Andersch et al. |
| 2008/0258880 | A1 | 10/2008 | Smith et al. |
| 2008/0263031 | A1 | 10/2008 | George et al. |
| 2008/0288646 | A1 | 11/2008 | Hasha et al. |
| 2009/0125639 | A1 | 5/2009 | Dam et al. |
| 2009/0271360 | A1 | 10/2009 | Bestgen et al. |
| 2009/0319503 | A1 | 12/2009 | Mehul et al. |
| 2009/0328115 | A1 | 12/2009 | Malik |
| 2010/0070570 | A1 | 3/2010 | Lepeska |
| 2010/0085948 | A1 | 4/2010 | Yu et al. |
| 2010/0094862 | A1 | 4/2010 | Bent et al. |
| 2010/0296416 | A1 | 11/2010 | Lee et al. |
| 2010/0306252 | A1 | 12/2010 | Jarvis et al. |
| 2011/0271319 | A1 | 11/2011 | Venable, Sr. |
| 2012/0269096 | A1 | 10/2012 | Roskind |
| 2013/0170336 | A1 | 7/2013 | Chen et al. |
| 2013/0276053 | A1 | 10/2013 | Hugard, IV et al. |
| 2014/0075505 | A1 | 3/2014 | Subramanian |
| 2014/0101133 | A1 | 4/2014 | Carston et al. |
| 2014/0149557 | A1 | 5/2014 | Lohmar |
| 2014/0164552 | A1 | 6/2014 | Kim et al. |
| 2014/0181295 | A1 | 6/2014 | Hindawi et al. |
| 2014/0244727 | A1 | 8/2014 | Kang et al. |
| 2014/0280280 | A1 | 9/2014 | Singh |
| 2014/0375528 | A1 | 12/2014 | Ling |
| 2015/0080039 | A1 | 3/2015 | Ling et al. |
| 2015/0149624 | A1 | 5/2015 | Hindawi et al. |
| 2015/0163121 | A1 * | 6/2015 | Mahaffey ............ G06F 11/0766 707/687 |
| 2015/0172228 | A1 | 6/2015 | Zalepa et al. |
| 2015/0256575 | A1 | 9/2015 | Scott |
| 2015/0373043 | A1 * | 12/2015 | Wang .................... G06F 21/552 706/12 |
| 2016/0080408 | A1 * | 3/2016 | Coleman ............. H04L 63/1433 726/22 |
| 2016/0119251 | A1 | 4/2016 | Solis et al. |
| 2016/0269434 | A1 * | 9/2016 | DiValentin .......... H04L 63/1408 |
| 2016/0352588 | A1 | 12/2016 | Subbarayan et al. |
| 2018/0191747 | A1 * | 7/2018 | Nachenberg ........ H04L 63/1416 |

OTHER PUBLICATIONS

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.
Rao et al., "Optimal Resource Placement in Structured Peer-to-Peer Networks," Jul. 2010, IEEE Transactions on Parallel and Distributed Systems, vol. 21, No. 7, 16 pgs.
Stoica, I., et al., "Chord: A Scalable Peer-to-Peer Lookup Service for Internet Applications," SIGCOMM '01, Aug. 27-31, 2001, San Diego, California, 12 pages.
Tanium Inc, International Search Report and Written Opinion, PCT/US2013/076971, dated Apr. 4, 2014, 18 pgs.
Tanium Inc, International Preliminary Report on Patentability, PCT/US2013/076971, dated Jun. 23, 2015, 14 pgs.
Tanium Inc, International Search Report and Written Opinion, PCT/US2014/067607, dated Feb. 18, 2015, 15 pgs.
Tanium Inc, International Preliminary Report on Patentability, PCT/US2014/067607, dated May 31, 2016, 10 pgs.
Tanium Inc, International Search Report and Written Opinion, PCT/US2015/020780, dated Jul. 2, 2015, 14 pgs.
Tanium Inc, International Preliminary Report on Patentability, PCT/US2015/020780, dated Sep. 27, 2016, 9 pgs.
Weixiong Rao et al, "Optimal Resource Placement in Structured Peer-to-Peer Networks," IEEE Transactions on Parallel and Distributed Systems, vol. 21, No. 7, Jul. 2010, 16 pgs.
Abdalkarim Awad et al., Virtual Cord Protocol (VCP): A Flexible DHT-like Routing Service for Sensor Networks, in Proceedings of the 5th IEEE International Conference on Mobile Ad Hoc and Sensor Systems, 2008, 10 pgs. 133-142.
Jae Woo Lee et al., 0 to 10k in 20 seconds: Bootstrapping Large-Scale DHT networks, 2011 IEEE International Conference on Communications, Jun. 9, 2011, pgs. 1-6.
Hindawi, Office Action, U.S. Appl. No. 15/702,617, dated Jun. 1, 2018, 37 pgs.
Hindawi, Final Office Action, U.S. Appl. No. 15/702,617, dated Dec. 27, 2018, 54 pgs.
Hunt, Office Action dated Sep. 10, 2018, US/215,474, 10 pgs.

(56) References Cited

OTHER PUBLICATIONS

Hunt, Final Office Action dated Apr. 1, 2019, U.S. Appl. No. 15/215,474, 7 pgs.
Google, Notice of Allowance, U.S. Appl. No. 15/713,518, dated Apr. 10, 2019, 14 pgs.

* cited by examiner

This XML file does not appear to have any style information associated with it. The document tree is shown below.
```xml
<ioc xmlns:xsi="http://www.w3.org/2001/XMLSchema-instance" xmlns:xsd="http://www.w3.org/2001/XMLSchema" xmlns="http://schemas.mandiant.com/2010/ioc" id="fc2d3e44-80a6-4add-ad94-de9f289e62ff" last-modified="2011-10-28T21:00:13">
    <short_description>CCAPP.EXE</short_description>
    <description>Custom Reverse shell.</description>
    <keywords/>
    <authored_by>Mandiant</authored_by>
    <authored_date>2010-12-13T12:49:53</authored_date>
    <links>
        <link rel="grade">Alpha</link>
    </links>
    <definition>
        <Indicator operator="OR" id="d610019c-379f-4d3e-b299-f0b0e5c3313a">
            <IndicatorItem id="86d0e6fc-ff41-4743-8a9a-c323ef8ad8cb" condition="is">
                <Context document="FileItem" search="FileItem/Md5sum" type="mir"/>
                <Content type="md5">9855c23be2b6f38630756a277b52cdd2</Content>
            </IndicatorItem>
            <IndicatorItem id="78c1c4c9-500f-40b3-be62-4c16b5058da9" condition="is">
                <Context document="FileItem" search="FileItem/Md5sum" type="mir"/>
                <Content type="md5">acb81bee009b09b2a0688f05ea45851f</Content>
            </IndicatorItem>
        </Indicator>
    </definition>
</ioc>
```

Figure 2A

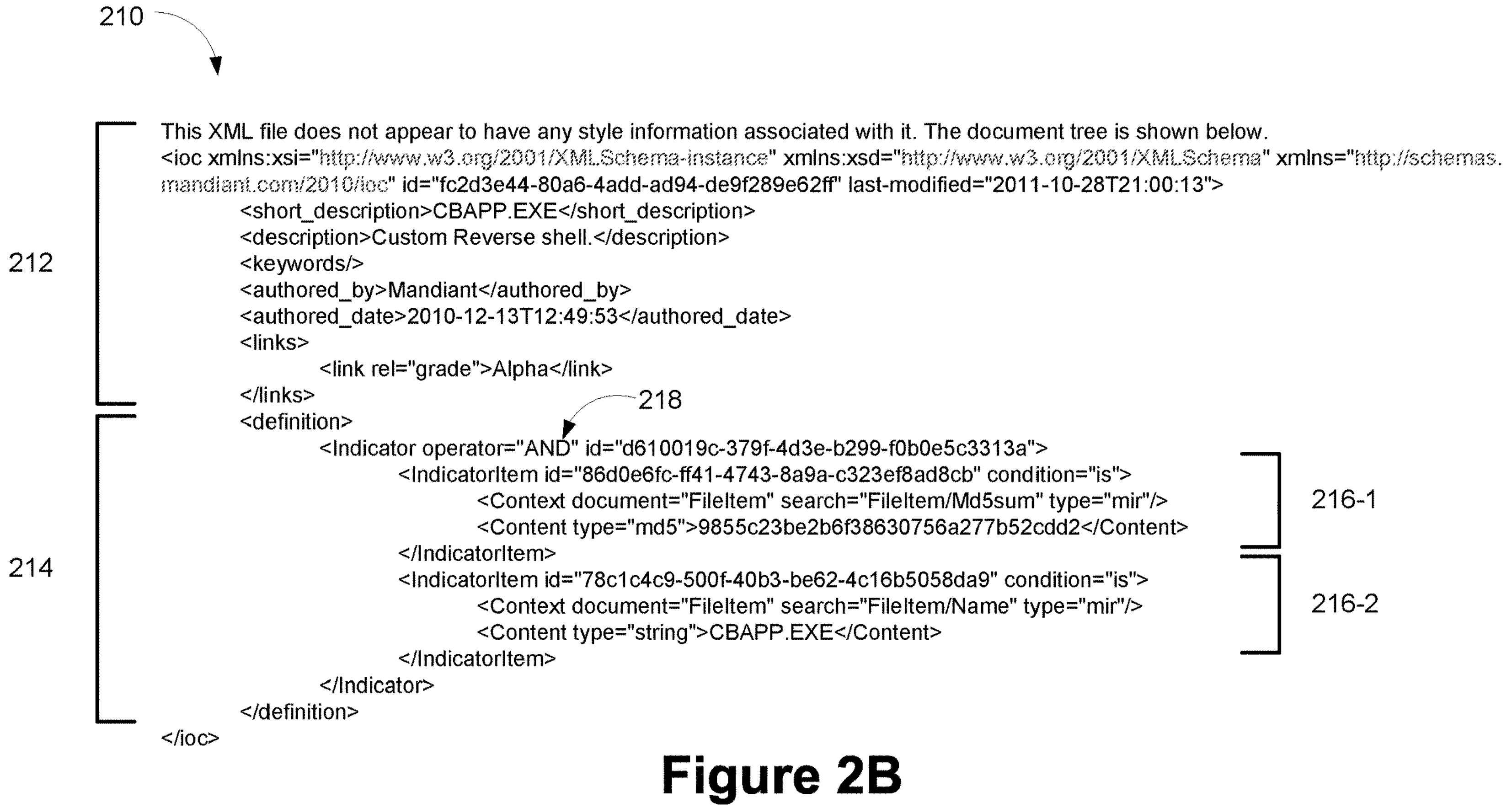

Figure 2B

This XML file does not appear to have any style information associated with it. The document tree is shown below.
```
<ioc xmlns:xsi="http://www.w3.org/2001/XMLSchema-instance" xmlns:xsd="http://www.w3.org/2001/XMLSchema" xmlns="http://schemas.mandiant.com/2010/ioc" id="fc2d3e44-80a6-4add-ad94-de9f289e62ff" last-modified="2011-10-28T21:00:13">
    <short_description>CBAPP.EXE</short_description>
    <description>Custom Reverse shell.</description>
    <keywords/>
    <authored_by>Mandiant</authored_by>
    <authored_date>2010-12-13T12:49:53</authored_date>
    <links>
        <link rel="grade">Alpha</link>
    </links>
    <definition>
        <Indicator operator="AND" id="d610019c-379f-4d3e-b299-f0b0e5c3313a">
            <IndicatorItem id="86d0e6fc-ff41-4743-8a9a-c323ef8ad8cb" condition="is">
                <Context document="FileItem" search="FileItem/Md5sum" type="mir"/>
                <Content type="md5">9855c23be2b6f38630756a277b52cdd2</Content>
            </IndicatorItem>
            <IndicatorItem id="78c1c4c9-500f-40b3-be62-4c16b5058da9" condition="is">
                <Context document="FileItem" search="FileItem/Name" type="mir"/>
                <Content type="string">CBAPP.EXE</Content>
            </IndicatorItem>
        </Indicator>
    </definition>
</ioc>
```

320

322

324

330 328 332 334-1 326-1 326-2 334-2

```
This XML file does not appear to have any style information associated with it. The document tree is shown below.
<ioc xmlns:xsi="http://www.w3.org/2001/XMLSchema-instance" xmlns:xsd="http://www.w3.org/2001/XMLSchema" xmlns="http://schemas.mandiant.com/2010/ioc" id="fc2d3e44-80a6-4add-ad94-de9f289e62ff" last-modified="2011-10-28T21:00:13" cost=110>
        <short_description>CBAPP.EXE</short_description>
        <description>Custom Reverse shell.</description>
        <keywords/>
        <authored_by>Mandiant</authored_by>
        <authored_date>2010-12-13T12:49:53</authored_date>
        <links>
                <link rel="grade">Alpha</link>
        </links>
        <definition>
                <Indicator operator="AND" id="d610019c-379f-4d3e-b299-f0b0e5c3313a" cost=110>
                        <IndicatorItem id="86d0e6fc-ff41-4743-8a9a-c323ef8ad8cb" condition="is" cost=100>
                                <Context document="FileItem" search="FileItem/Md5sum" type="mir"/>
                                <Content type="md5">9855c23be2b6f38630756a277b52cdd2</Content>
                        </IndicatorItem>
                        <IndicatorItem id="78c1c4c9-500f-40b3-be62-4c16b5058da9" condition="is" cost=10>
                                <Context document="FileItem" search="FileItem/Name" type="mir"/>
                                <Content type="string">CBAPP.EXE</Content>
                        </IndicatorItem>
                </Indicator>
        </definition>
</ioc>
```

```
<IndicatorItem id="78c1c4c9-500f-40b3-be62-4c16b5058da9" condition="is" encoding=MD5>
        <Context document="FileItem" search="FileItem/Name" type="mir"/>
        <Content type="string">CAA19D52FDB8E1151F378F7C4BF62F76</Content>
</IndicatorItem>
```

Figure 3C

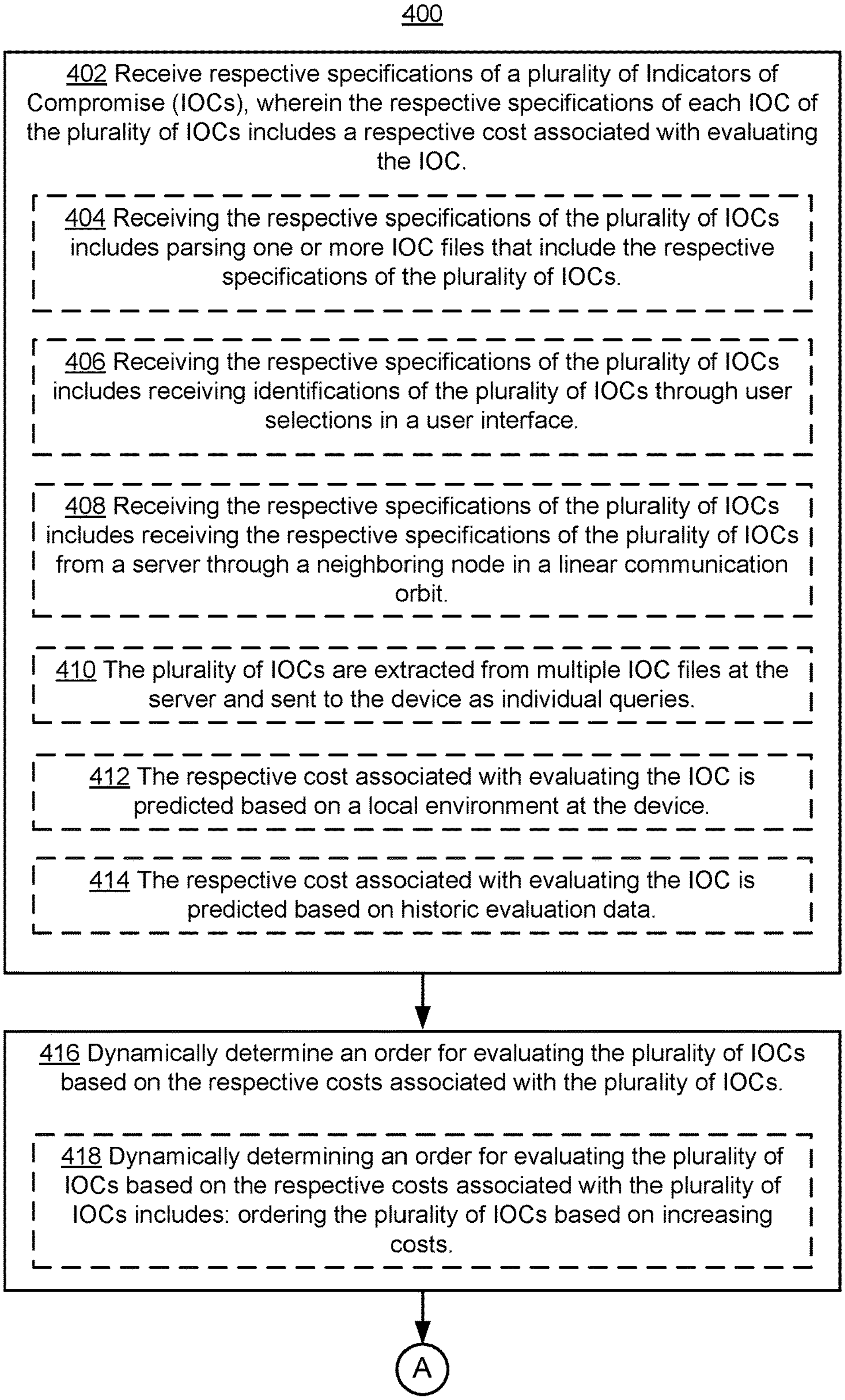

402 Receive respective specifications of a plurality of Indicators of Compromise (IOCs), wherein the respective specifications of each IOC of the plurality of IOCs includes a respective cost associated with evaluating the IOC.

> 404 Receiving the respective specifications of the plurality of IOCs includes parsing one or more IOC files that include the respective specifications of the plurality of IOCs.

> 406 Receiving the respective specifications of the plurality of IOCs includes receiving identifications of the plurality of IOCs through user selections in a user interface.

> 408 Receiving the respective specifications of the plurality of IOCs includes receiving the respective specifications of the plurality of IOCs from a server through a neighboring node in a linear communication orbit.

> 410 The plurality of IOCs are extracted from multiple IOC files at the server and sent to the device as individual queries.

> 412 The respective cost associated with evaluating the IOC is predicted based on a local environment at the device.

> 414 The respective cost associated with evaluating the IOC is predicted based on historic evaluation data.

416 Dynamically determine an order for evaluating the plurality of IOCs based on the respective costs associated with the plurality of IOCs.

> 418 Dynamically determining an order for evaluating the plurality of IOCs based on the respective costs associated with the plurality of IOCs includes: ordering the plurality of IOCs based on increasing costs.

(A)

COST PRIORITIZED EVALUATIONS OF INDICATORS OF COMPROMISE

PRIORITY CLAIM AND RELATED APPLICATIONS

This application claims the benefit of U.S. Provisional Application Ser. No. 62/305,482, filed Mar. 8, 2016, titled "Cost Prioritized Evaluations of Indicators of Compromise"; and U.S. Provisional Patent Application Ser. No. 62/333,768, filed May 9, 2016, titled "System and Method for Performing Event Inquiries in a Network." The content of each of the above provisional applications is hereby incorporated by reference in its entirety.

This application is related to U.S. patent application Ser. No. 13/797,946, filed Mar. 12, 2013, now U.S. Pat. No. 9,246,977, titled "System, Security and Network Management Using Self-Organizing Communication Orbits in Distributed Networks"; U.S. patent application Ser. No. 12/412,623, filed Mar. 27, 2009, now U.S. Pat. No. 8,086,729, titled "Distributed Statistical Detection of Network Problems and Causes"; U.S. patent application Ser. No. 13/084,923, filed Apr. 12, 2011, now U.S. Pat. No. 8,904,039, titled "Large-Scale Network Querying and Reporting"; U.S. patent application Ser. No. 13/107,625, filed May 13, 2011, now U.S. Pat. No. 8,903,973, titled "Parallel Distributed Network Management"; U.S. patent application Ser. No. 14/553,769, filed Nov. 25, 2014, titled "Fast Detection and Remediation of Unmanaged Assets"; U.S. patent application Ser. No. 14/554,739, filed Nov. 26, 2014, titled "Data Caching and Distribution in a Local Network"; and U.S. patent application Ser. No. 15/136,790, filed Apr. 22, 2016, titled "Reliable Map-Reduce Communications in a Decentralized, Self-Organizing Communication Orbit of a Distributed Network." Content of each of the above applications is hereby incorporated by reference in its entirety. The above applications are also referred to hereafter as "the Related Applications" or "the Incorporated Disclosure."

TECHNICAL FIELD

The present disclosure relates to threat detection and management in computers and computer networks using indicators of compromise (IOCs).

BACKGROUND

An indicator of compromise (IOC) is an observable (e.g., an artifact)—or a set of observables—on a computer, computer network, or operating system that indicates an intrusion of that computer, computer network, or operating system. Some IOCs indicate the presence of a computer virus or malware. Specific examples of IOCs include virus signatures, IP addresses, hashes of malware files (e.g., MD5 hashes), and URLs of botnet command and control servers. As a more specific example, a virus might typically be stored under the file name "[VIRUS-NAME].EXE," so finding a file named "[VIRUS-NAME].EXE" on a computer indicates that the computer has been compromised by the virus.

Many indicators of compromise, however, are not as simple as a file name for a known virus. Instead, detecting some indicators of compromise requires expending significant computational resources and time, so there is a significant computational cost associated with detecting these IOCs. Moreover, in some circumstances, there may be an easy way and a hard way to detect a particular threat. For example, although a virus might typically be stored under the file name "VIRUS.EXE," the virus's file name may have been changed to avoid detection. In such cases, a more complex operation, such as a MD5 hash of the file contents, might reveal a reliable indicator of compromise. Therefore, either the file name or "VIRUS.EXE" or the MD5 hash value for the file contents indicates the threat.

But conventional methods of threat detection do not take into account the computational costs (e.g., computational resources and time) that arise from evaluating different indicators of compromise. Conventional methods of threat detection are no more likely to first try to detect a threat the easy way than the hard way. The result is a needlessly high expenditure of computational resources—and administrators' time—spent on threat detection, and possibly undesirable consequences due to delays in detecting and remedying the threat.

SUMMARY

Accordingly, there is a need for methods of threat detection and management that prioritize evaluations of indicators of compromise based on computational cost and quickly dispatch instructions for remedial actions to the comprised machines. To that end, a method of threat management (e.g., including evaluating indicators of compromise (IOCs) and/or dispatching remedial actions to compromised machines) is provided. The method is performed at a device having one or more processors and memory. The method includes receiving respective specifications of a plurality of IOCs. The respective specification of each IOC of the plurality of IOCs includes a respective cost associated with evaluating the IOC. The method further includes dynamically determining an order for evaluating the plurality of IOCs based on the respective costs associated with the plurality of IOCs, and determining whether a threat is present based on results for evaluating one or more of the plurality of IOCs in accordance with the dynamically determined order, instead of an order by which the plurality of IOCs have been received at the device.

In some embodiments, determining whether a threat is present based on results for evaluating one or more of the plurality of IOCs in accordance with the dynamically determined order further includes: evaluating the plurality of IOCs locally in accordance with the dynamically determined order; and determining whether a threat is present when at least one of the plurality of IOCs has been evaluated.

In some embodiments, determining whether a threat is present based on results for evaluating one or more of the plurality of IOCs in accordance with the dynamically determined order further includes: sending queries into a linear communication orbit comprising a sequence of nodes, to collect IOC evaluation results for the plurality of IOCs in accordance with the dynamically determined order; and determining whether a threat is present when evaluation results for at least one of the plurality of IOCs has been received from the nodes in the linear communication orbit.

In some embodiments, the method further includes: upon detection of a threat, automatically performing one or more remedial actions to address the detected threat.

In some embodiments, receiving the respective specifications of the plurality of IOCs includes parsing one or more IOC files that include the respective specifications of the plurality of IOCs.

In some embodiments, receiving the respective specifications of the plurality of IOCs includes receiving identifications of the plurality of IOCs through user selections in a user interface.

In some embodiments, receiving the respective specifications of the plurality of IOCs includes receiving the respective specifications of the plurality of IOCs from a server through a neighboring node in a linear communication orbit.

In some embodiments, the plurality of IOCs are extracted from multiple IOC files at the server and sent to the device as individual queries.

In some embodiments, evaluating at least one indicator item of the plurality of IOCs includes an evaluation of encoded values.

In some embodiments, the respective cost associated with evaluating the IOC is predicted based on a local environment at the device.

In some embodiments, the respective cost associated with evaluating the IOC is predicted based on historic evaluation data.

In some embodiments, the method further includes receiving user input modifying the respective costs associated with one or more of the plurality of IOCs. The method further includes, in response to receiving the user input: modifying the respective costs associated with the one or more of the plurality of IOCs; and dynamically determining a revised order for evaluating the plurality of IOCs based on the respective costs associated with the plurality of IOCs, including the modified respective costs associated with the one or more IOCs.

In some embodiments, dynamically determining an order for evaluating the plurality of IOCs based on the respective costs associated with the plurality of IOCs includes ordering the plurality of IOCs based on increasing costs.

In some embodiments, the method includes receiving a cost quota for evaluating the plurality of IOCs, wherein evaluating one or more of the plurality of IOCs in accordance with the dynamically determined order includes determining which ones of the plurality of IOCs to evaluate based on the cost quota and the dynamically determined order for evaluating the plurality of IOCs.

In some embodiments, the method further includes determining a respective frequency for evaluating a respective IOC of the plurality of IOCs based on the respective cost associated with the respective IOC. In some embodiments, determining a respective frequency for evaluating a respective IOC of the plurality of IOCs based on the respective cost associated with the respective IOC includes determining the respective frequency for evaluating the respective IOC based on the respective cost associated with the respective IOC and cost criteria received for evaluating the plurality of IOCs.

In some embodiments, a first IOC of the plurality of IOCs includes a plurality of sub-components, and the respective cost associated with evaluating the first IOC includes a sum of respective sub-costs associated with evaluating the plurality of sub-components of the first IOC. In some embodiments, the method further includes dynamically determining a sub-order for evaluating the plurality of sub-components of the first IOC based on the respective sub-costs associated with the plurality of sub-components of the first IOC; and evaluating the plurality of sub-components of the first IOC in accordance with the dynamically determined sub-order, instead of an order by which the plurality of sub-components exist in the first IOC.

In some embodiments, the plurality of sub-components of the first IOC includes a plurality of indicator items joined by a logical AND operator, and dynamically determining the sub-order for evaluating the plurality of sub-components of the first IOC includes ordering evaluations of the plurality of indicator items in accordance with increasing sub-costs associated with the evaluations of the plurality of indicator items.

In some embodiments, the method further includes evaluating the plurality of IOCs locally in accordance with the dynamically determined order; and while evaluating the plurality of IOCs in accordance with the dynamically determined order, bypassing at least one of the plurality of indicator items that is yet to be evaluated, when a negative outcome is reached for an indicator item that is ordered before said at least one indicator joined by the logical AND operator.

In some embodiments, the method further includes, maintaining an index for looking up local results for one or more indicator items, wherein a cost associated with looking up a local result for a respective indicator item from the index is lower than a cost associated with evaluating the respective indicator item in real-time at the device.

In some embodiments, the method includes detecting that one or more of the plurality of IOCs includes indicator items present in the index. The method further includes, in response to detecting that one or more of the plurality of IOCs includes at least one indicator item present in the index: modifying the respective costs associated with the one or more of the plurality of IOCs in accordance with the cost for looking up the at least one indicator item in the index; and dynamically determining a revised order for evaluating the plurality of IOCs based on the respective costs associated with the plurality of IOCs, including the modified respective costs associated with the one or more IOCs.

In some embodiments, the method further includes detecting an instruction for evaluating the at least one indicator item in lieu of looking up the at least one indicator item from the index. The method further includes, in response to detecting the instruction, forgoing the modification of the respective costs associated with at least one indicator item and the determination of the revised order for evaluating the plurality of IOCs.

In some embodiments, the respective specification of at least one indicator item in the plurality of IOCs includes a first cost for evaluating the at least one indicator item in real-time evaluation and a second cost for looking up the at least one indicator item from a local index. The method further includes: detecting that at least one indicator item is present in the index maintained at the device; and in response to detecting that at least one indicator item is present in the index maintained at the device, choosing the second cost as the respective cost associated with the at least one indicator item when dynamically determining the order for evaluating the plurality of IOCs based on the respective costs associated with the plurality of IOCs.

In some embodiments, at least one indicator item in the index includes an encoded key-value pair.

In some embodiments, a computer system (e.g., node 102 and/or server 108 (FIGS. 1, 5)) includes one or more processors and memory storing one or more programs for execution by the one or more processors, the one or more programs include instructions for performing, or controlling performance of, the operations of any of the methods described herein. In some embodiments, a non-transitory computer readable storage medium stores one or more programs, the one or more programs comprising instructions, which, when executed by a computer system (e.g., node 102 and/or server 108 (FIGS. 1, 5)) with one or more processors, cause the computer system to perform, or control performance of, the operations of any of the methods described herein. In some embodiments, a computer system (e.g., node 102 and/or server 108 (FIGS. 1, 5)) includes means for performing, or controlling performance of, the operations of any of the methods described herein.

Other embodiments and advantages are apparent to those skilled in the art in light of the descriptions and drawings in this specification.

BRIEF DESCRIPTION OF THE DRAWINGS

FIGS. 2A-2B illustrate examples of specifications of indicators of compromise, where the specifications do not expressly provide a cost associated with the indicators of compromise, in accordance with some embodiments.

FIGS. 3A-3B illustrate examples of specifications of indicators of compromise, where each exemplary specification expressly provides a cost associated with the indicator of compromise, in accordance with some embodiments.

FIG. 3C illustrates an encoded specification for a single observable (called an indicator item), in accordance with some embodiments.

FIGS. 4A-4F illustrate a flow chart of a method for threat management (e.g., including threat detection, and optionally, dispatching and/or executing remedial actions) through evaluating indicators of compromise in accordance with, or prioritized according to, at least a cost associated with the respective indicators of compromise, in accordance with some embodiments.

Like reference numerals refer to corresponding parts throughout the drawings.

DESCRIPTION OF EMBODIMENTS

Figure 1:
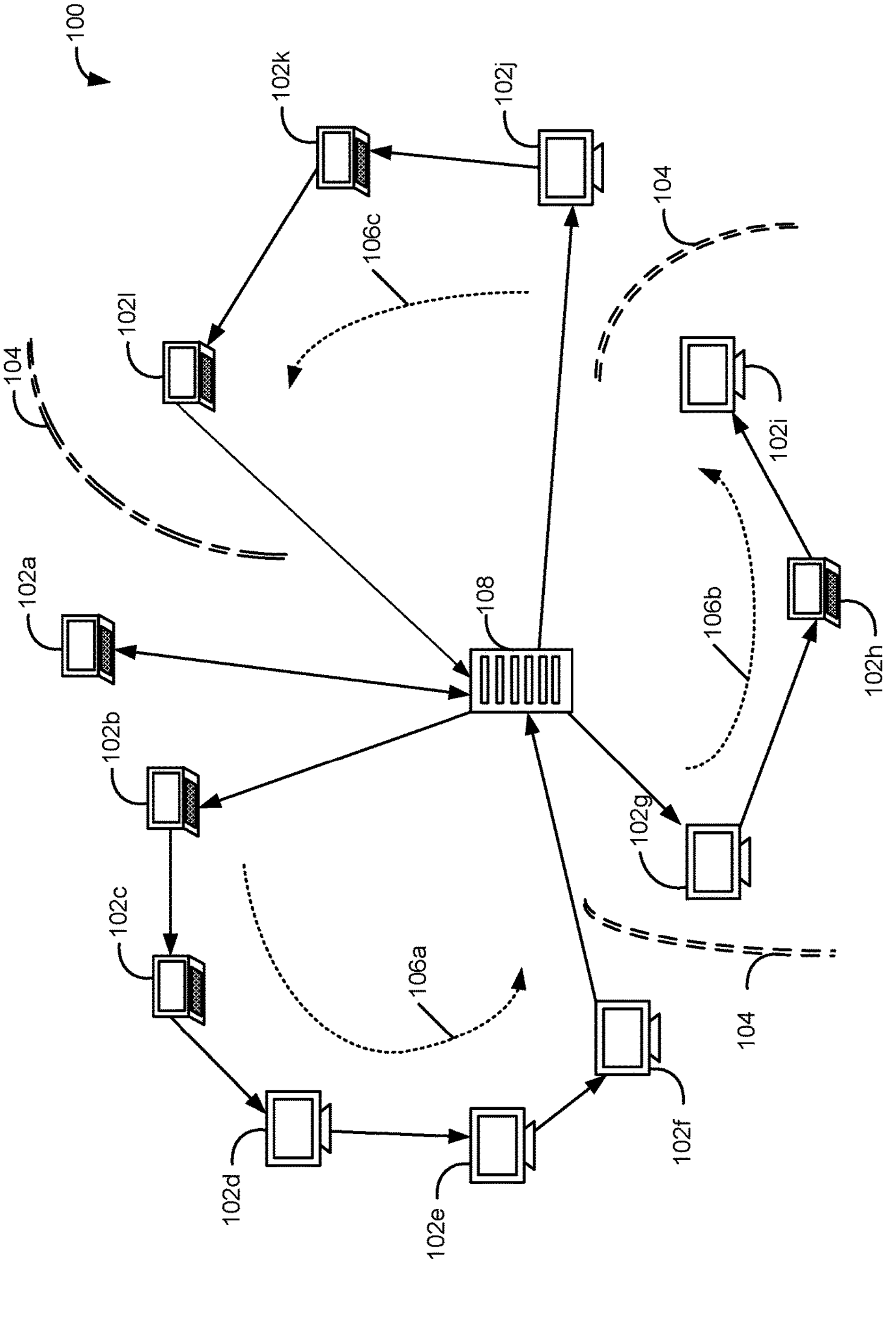
FIG. 1 illustrates a computer network organized into linear communication orbits, in accordance with some embodiments.

The methods and devices described herein improve on conventional methods of threat detection and management by prioritizing evaluation of indicators of compromise (IOCs) based on a computational cost associated with their evaluation and quickly dispatching appropriate remedial actions to the affected node(s), where "affected nodes" are nodes for which the evaluation of one or more IOCs has produced a result indicating that the node is or may be compromised. In accordance with some embodiments, a computer receives a plurality of IOC specifications, each of which has a cost associated with its evaluation. The computer automatically and dynamically arranges the IOCs into an order of evaluation based on their costs, and determines whether a threat is present based on results for evaluating one or more of the plurality of IOCs in accordance with the dynamically determined order, instead of an order by which the plurality of IOCs have been received at the device.

In some embodiments, the computer is a node in a network of nodes (e.g., a node in a linear communication orbit or a hub-and-spoke network), and the node evaluates the plurality of IOCs locally in accordance with the dynamically determined order; and determines whether a threat is present locally when at least one of the plurality of IOCs has been evaluated. In other words, the computer need not perform all of the IOC evaluations or perform some more complex and costly IOC evaluations before other easier IOC evaluations in order to detect a threat. Consequently, threat detection may be carried out with less computational cost (e.g., computing power, memory, time, etc.). In some embodiments, the computer automatically takes one or more remedial actions to address the detected threat. For example, the computer may generate an alert or report for the detected threat, and awaits instructions for further remedial actions from an administrator or a server. In some embodiments, the computer automatically executes one or more default remedial actions for the detected threat. Examples of remedial actions are quarantining the computer from the rest of the network, cleaning or deleting or quarantining one or more offending files, and/or collecting local artifacts for deeper investigation of the detected threat, etc. In some embodiments, when the node is in a linear communication orbit, the detected threat can be quickly reported to an administrator or server through messages propagated through the linear communication orbit; and similarly, instructions for customized remedial actions for the detected threat can also be quickly dispatched from the administrator or server to the affected node(s) through the linear communication orbit. Thus, faster and more effective threat management may be achieved in a network arranged into a linear communication orbit.

In some embodiments, the computer is a server in a network of nodes (e.g., a server in a linear communication orbit or a hub-and-spoke network). The server generates queries for the plurality of IOCs (e.g., one query for each indicator item in the plurality of IOCs, or one query for multiple similar/identical indicator items in the plurality of IOCs), and sends the queries to the nodes in the network (e.g., the server sends the queries into a linear communication orbit comprising a sequence of nodes) to collect IOC evaluation results for the plurality of IOCs in accordance with the dynamically determined order of the IOCs. In some embodiments, IOC evaluation results are collected from only from nodes in the linear communication orbit that meet predefined filter criteria. The filter criteria limit the nodes that respond to a particular query, and thus limit the set of nodes that evaluate an IOC, or IOC component, or set of IOCs. Without limitation, in some examples, the filter criteria limit the set of nodes that response to a query to nodes using a particular operating system, or nodes using a particular type of operating system, or nodes that use a particular communication protocol, or nodes that use of particular type of communication protocol, or nodes that are devices of a particular type or a particular class or category of device types.

The server determines whether a threat is present on respective nodes when evaluation results for at least one of the plurality of IOCs has been received from the nodes in the linear communication orbit. In some embodiments, the server determines whether a threat is present in the network and which node(s) are affected in accordance with the evaluation results received from multiple nodes in the network. In some embodiments, the server determines whether a threat is present at a particular node based on the evaluation result received from that particular node, or based on a combination of two or more evaluation results received from that particular node. In some embodiments, when a threat is detected by the server, the server sends instructions for customized remedial actions for the detected threat through the linear communication orbit or directly to the affected node(s). Thus, faster and more effective threat management may be achieved in a network arranged into a linear communication orbit.

In some embodiments, in a network having nodes arranged into a linear communication orbit, the server generates queries for the plurality of IOCs and sends the queries to the nodes in the network without any particular order (e.g., queries are sent out in the order that they are generated from the plurality of IOCs), and the nodes receiving the queries determine which ones of the queries to responds to and in what order, in accordance with the relative cost associated with the IOC evaluations represented in the queries. In some embodiments, the costs associated with the IOC evaluations may be different for different nodes and/or at different times (e.g., due to differences in the local computing environment at the different nodes and/or at the different times). Consequently, different nodes may perform the IOC evaluations in different orders from one another, and threat detection may occur for different nodes when different subsets of IOCs have been evaluated at the nodes. In some embodiments, the server determines whether a threat is present at one or more nodes in the network based on evaluation results received from the one or more nodes. In some embodiments, individual nodes determine whether a threat is present locally based on one or more evaluation results obtained locally at the individual node. In some embodiments, the server automatically dispatches instructions for one or more remedial actions to the affected node(s) upon detection of a threat. In some embodiments, the affected nodes automatically carry out one or more default remedial actions upon detection of a threat.

In some embodiments, the computer determines which subsets of IOCs to evaluate and at what frequencies based on one or more cost criteria. For example, the cost criteria may specify that only IOCs with costs below a certain threshold may be evaluated under a given condition (e.g., when the CPU is less than 50% utilized, or when the computer is idle (e.g., meets predefined idleness criteria), or when power costs meet predefined criteria (e.g., electricity rates are lowest). In another example, the cost criteria may specify that IOCs with costs above a certain threshold may only be evaluated at certain mission critical machines or during a period of heightened threat level. In some embodiments, different cost criteria may be sent to and applied at different nodes in the network. By adjusting the cost criteria for the different nodes in the network, threat management may be performed with more efficiency (e.g., less total computational cost and quicker response time).

In some embodiments, the computer determines which subsets of IOCs to evaluate and at what frequencies (sometimes herein called scheduling execution of IOCs), while adhering to the dynamically determined order for the plurality of IOCs, while in some other embodiments the computer schedules execution of IOCs without dynamically determining the order for the plurality of IOCs and thus without adhering to the dynamically determined order for the plurality of IOCs.

In some embodiments, the computer (e.g., a standalone computer or a computer or server in a network) evaluates the IOCs (sometimes called evaluating IOC specifications, since each IOC has an IOC specification) in accordance with the cost-based order of evaluation rather than, for example, the order in which the IOCs were received (e.g., a first-in/first-out order). In some embodiments, lower cost IOC specifications are evaluated before higher cost IOC specifications. In some embodiments, lower cost IOC specifications are evaluated more frequently than higher costs IOC specifications (e.g., lower cost IOC specifications are scheduled more frequently than higher cost IOC specifications for routine threat surveillance).

In some embodiments, an IOC specification includes a plurality of sub-components, sometimes herein called IOC components or IOC sub-components, each of which has a sub-cost associated with it. For example, a sub-component may correspond to a single observable or a single evaluation that is to be performed. In some embodiments, instructions for identifying a single observable (also called an artifact) are stored as an "indicator item" in an IOC specification. An IOC specification will include one or more indicator items, each of which has a sub-cost associated with it. The computer will rearrange (re-order) the sub-components within an IOC specification based on the sub-costs and evaluate the sub-components of the IOC specification in accordance with the sub-cost-based order of the sub-components (e.g., lowest cost first). In some embodiments, the server may determine an order for evaluating the IOCs based on respective total costs of the IOCs, while individual nodes may determine an order for evaluating the sub-components of a particular IOC based on the sub-costs of the sub-components.

Re-ordering the order of evaluating sub-components is particularly useful when the sub-components are joined by a logical operator such as AND or OR. Consider the example described in the background section, where either a file name "VIRUS.EXE" or a specified MD5 hash value for the file contents indicates a threat. The IOC specification will include a sub-component specifying the file name and a sub-component specifying the MD5 hash value. Evaluation of a file name may have a cost of 10, while the MD5 hash value evaluation may have a cost of 100. The computer will rearrange the IOC specification to evaluate the file name before evaluating the MD5 hash value of the file. When sub-components are joined by the logical operator OR (also herein called the "logical OR operator" or the "OR operator"), the computer will cease evaluating sub-components and return a positive result (e.g., a result indicating a threat) the first time a sub-component returns a match. Thus, if the computer, searching within a set of files, finds a file with the file name "VIRUS.EXE," it will forgo evaluating the MD5 hash value for other files in the set of files. Similarly, when the logical sub-components are joined by the logical operator AND (also herein called the "logical AND operator" or the "AND operator"), the computer will cease evaluating sub-components and return a negative result (e.g., a result indicating no threat) the first time a sub-component returns a non-match.

In some embodiments, the cost is expressly provided in the IOC specification. An IOC specification may, for example, include a cost field that specifies a cost of 200. In some embodiments, the computer determines a cost from the actions that have to be performed in order to evaluate the IOC. For example, evaluation of a file name might have a cost of 10, whereas evaluation of an MD5 hash value of a file might have a cost of 100. Thus, when an IOC specification consists of instructions to evaluate a file name and instructions to evaluate an MD5 hash value of a file, the computer determines the cost associated with the IOC specification by summing costs associated with the two subcomponents to obtain an IOC cost of 110 (e.g., without the cost being expressly specified within the IOC specification).

FIG. 1 illustrates a computer network organized into linear communication orbits, in accordance with some embodiments. More specifically, FIG. 1 illustrates a managed network 100 comprising a plurality of interconnected machines or nodes 102 (including 102*a-l*), e.g., computers, servers, mobile devices, and other networked devices that are arranged into one or more linear communication orbits. In some embodiments, the methods described herein for evaluating indicators of compromise are performed at one or more nodes of a linear communication orbit. In some embodiments, the methods described herein for evaluating indicators of compromise are performed at a server of the linear communication orbit. The linear communication orbit structure shown in FIG. 1 is an alternative to the conventional hub-and-spoke architecture for managed networks. However, in some embodiments, the methods described herein for evaluating indicators of compromise are performed at one or more nodes/servers of a hub-and-spoke network.

Examples of managed network 100 include an enterprise network or another network under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, the network 100 is separated from external networks by one or more firewalls 104.

In some embodiments, machines 102 currently coupled to network 100 are self-organized into one or more contiguous segments 106 of a single linear communication orbit. In some embodiments, each contiguous segment 106 constitutes a respective linear communication orbit.

In some embodiments, managed network 100 also includes server 108 that facilitates the creation and maintenance of the one or more contiguous segments 106. The server 108 may be relatively lightweight, and may be elected from machines 102 in the network.

In some embodiments, as shown in FIG. 1, the linear communication orbit linking all of the machines coupled to network 100 includes a respective communication channel between each pair of adjacent machines in an ordered sequence of all machines 102 in network 100. In some embodiments, communication between a pair of adjacent machines 102 (e.g., machine 102*g* and machine 102*f*) across a firewall 104 may need to be bridged by an intermediate server (e.g., server 108).

An important feature of the linear communication orbit(s) 106 is that, in some embodiments, they are automatically formed without global, continuous, and/or active intervention by any network administrative program or personnel. Each machine 102 joining network 100 is equipped with (or provided with) a set of predetermined rules. According to the set of predetermined rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit grows or contracts as machines join and leave network 100 (e.g., the network is non-static), through the independent local actions of the machines in network 100, without global, continuous, and/or active intervention by any network administrative programs or personnel. Although all machines 102 implement the same set of rules, and each machine directly interacts only with its immediate neighbor machines to facilitate the formation of the orbit, the rules are designed in a way that cause the machines' independent local actions to be globally consistent and to result in self-organization and automatic repair and maintenance of linear communication orbit(s) 106.

In some embodiments, all machines 102 coupled to network 100 are sorted into an ordered sequence according to a respective unique identifier associated with each machine 102. These identifiers are also referred to as the addresses of the machines in the network. For example, in some embodiments, respective IP addresses of machines 102 are used as the identifiers to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined rules provides a deterministic way of sorting the unique identifiers or addresses of that type into an ordered sequence. Given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

In some embodiments, each machine 102 receiving a communication message (e.g., a message including a question part, and an answer part) from its upstream neighbor node acts upon the message by providing an update to the message based on its local state or information, performing some aggregation of the information in the message (e.g., by adding to or modifying aggregated results already included in the message as received from its upstream neighbor), and/or forwarding the message to its downstream neighbor node along the linear communication orbit. Essentially, each machine expends a small amount of resources to take on a small part of the duties of data aggregation without being overly burdened. In the threat management scenario, in some embodiments, the query part of a message may include a request for evaluating an indicator item (e.g., "is a file with a filename [VIRUS.EXE] present?", and the answer part may be a HIT counter (e.g., a counter for "YES" answers) or log to which a node can append its ID if the result of the evaluation is a hit (e.g., a "YES" answer). In some embodiments, instructions for a remedial action (e.g., an executable script) and criteria for determining which node or nodes should execute the instructions for the remedial action (e.g., IDs or characteristics of the affected node(s)) may be included in a communication message and propagated along the linear communication orbit. Nodes fitting the criteria will execute the remedial action when they receive the communication message. More details on how the system, security and network management messages are propagated to and collected from machines 102 in network 100 through linear communication orbit(s) 106 are provided in the Incorporated Disclosure set forth above.

In some embodiments, each node implements a set of common rules such that each node in the linear communication orbit knows what to do with respect to each query it receives or knows about, without requiring excessive back and forth interactive communications between the nodes themselves or between the nodes and the central management of a server or administrator. This set of common rules is different from the set of common rules for establishing and maintaining the linear communication orbit as described in the Incorporated Disclosure, and can be used in addition to the set of common rules for establishing and maintaining the linear communication orbit.

An advantage of message communication over the linear communication orbit is that queries, answers, and/or instructions regarding threat detection and management can be quickly passed to and from a node or the server without excessive communication and computational overhead. In some embodiments, the server generates individual queries based on IOC feeds or specifications received from various sources (e.g., third-party threat research firms, internal threat management personnel, etc.), where each query contains a request for evaluation of one or more indicator items at one or more targeted nodes (e.g., nodes that meet certain criteria specified in the query). In some embodiments, the server of the network (or a remote third-party server (not shown) in communication with the server of the network) determines the order, frequency, and/or priority by which the queries should be injected into the network based on at least the costs associated with evaluating the different indicator items. In some embodiments, the server of the network sends out all of the queries and the criteria that individual nodes can use to locally prioritize the evaluation of the indicator items (e.g., costs and/or evaluation priority for the different indicator items, and/or cost quota allotted for the evaluations of indicator items at different types of nodes) in the queries. The individual nodes perform local evaluation of the indicator items with the order and frequencies set in accordance with the criteria, and send the results back to the server of the network through the linear communication orbit.

In some embodiments, the server of the network sends the results (e.g., sends an aggregated response) to the remote server that is in communication with the server of the network. In some embodiments, the server of the network or the remote server determines whether a threat exists in the network and automatically sends out instructions for one or more remedial actions to be carried out at the affected node(s) (e.g., quarantining the affected nodes from the rest of the network, and/or deleting, or cleaning up or quarantining offending files, and/or collecting artifacts from the affected nodes, etc.). In some embodiments, the result of one or more IOC evaluations is automatically sent to an administrator interface from an affected node, and an administrator can design and dispatch appropriate remedial and/or investigative actions to the affected node through a direct connection or through the linear communication orbit.

In some embodiments, the remote server communicates with the server of the network via a secure connection. In some embodiments, when the remote server needs to send a message or instruction packet to a particular node in the network and a direct connection between the remote server and the particular node does not already exist, the remote server optionally sends the message to the server of the network and has the server of the network forward the message or instruction packet to the particular node along the linear communication orbit. In some embodiments, the remote server starts a network-wide information gathering processes by sending a series of queries or one or more IOCs to the server of the network (or a starting node of the linear communication orbit), allowing the server of the network (or the starting node) to propagate the queries or IOCs into the network along the linear communication orbit, and receiving the answers or evaluation results (e.g., individual answers, aggregated answers, and/or metrics and statistics computed based on the answers or evaluation results collected from the nodes in the network) from the server of the network (or an end node of the linear communication orbit).

The lightweight, decentralized mechanism (e.g., the set of common action rules observed by the nodes in the network) allows the nodes in the network to self-organize into one or more linear communication orbits, and allows the linear communication orbits to recover/self-heal from broken links and slow connections (e.g., by temporarily bypassing the unresponsive nodes) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the nodes in separate messages, and the messages may be propagated down the linear communication orbit, processed in parallel at the nodes, and answered by as many nodes as possible (e.g., nodes that satisfy matching criteria specified by the messages), without being held up by any slow responding nodes. In fact, communication with and data collection from any and all nodes in the network (e.g., enterprise networks with thousands or millions of nodes) may be accomplished in substantially real-time (e.g., a matter of seconds), as opposed to taking days and weeks in a network with a conventional hierarchical or hub-and-spoke configuration. For example, messages are delivered to the nodes at the speed at which messages are propagated through the linear communication orbit, and the processing of the queries at the nodes occurs after receiving the messages, in parallel at the nodes. In some embodiments, answers to the queries are collected in a subsequent traversal of the linear communication orbit by either the original messages (propagating in the reverse direction) or by subsequent "answer collection" messages.

In some embodiments, the remote server communicates (e.g., sends messages and/or queries) directly with a respective node (e.g., node **102*f*) over direct duplex connection (e.g., a WebSocket connection). Various methods are provided herein for establishing direct duplex connections between the remote server and nodes 102 in a linear communication orbit. A direct duplex connection is particularly useful when the remote server needs to take a deep-dive into a respective node in the network (e.g., to carry out frequent back and forth interactions and/or to transfer large amount of local event data and/or deploy a security patch), rather than investigating the network at-large. The messages and/or queries can be analogous to those described above, but they are sent directly to the respective node via a direct duplex connection (rather than being propagated through a linear communication orbit, such as linear communication orbit 106*a*), and without the communication needing to be bridged by the server of the network. In some embodiments, the remote server can communicate with the respective node either through a direct duplex connection (e.g., when the remote server wants to query only the respective node) or through linear communication orbit 106*a* (e.g., when the remote server wants an aggregated response to a query from some or all of the nodes 102 in the linear communication orbit 106*a***).

As described herein, the direct duplex connection between a particular node and the remote server is established with the particular node as the initiating party. In other words, from the perspective of the network, the connection is established with an outbound connection request sent from the node, rather than with an inbound connection request sent from the remote server. When the direct duplex connection is established with an outbound connection request sent from the node (e.g., the node sends the initial connection request in the connection establishment protocol (e.g., the handshake request in establishing a Web Socket connection)), there is no need to open the firewall of the network, which would expose the network to outside security risks.

In some embodiments, in order to prompt a particular node to initiate the connection request for a direct duplex connection, the remote server sends a message or instruction packet to the particular node (e.g., node **102*f*) through a server of the network and has the message or instruction packet propagated to the particular node through the linear communication orbit (e.g., linear communication orbit 106*a***). The message or instruction packet contains instructions and the necessary data (e.g., public certificate for encryption, IP address, port #) for the particular node to establish the direct point-to-point persistent connection (e.g., a Web Socket connection) with the remote server. When the particular node receives the instruction packet from its upstream node, the particular node initiates the outbound connection request to the remote server. After the remote server receives the connection request from the particular node, the remote server and the node can proceed to establish the duplex connection according to the connection protocol.

In some embodiments, the instruction packet can be dispatched to one or more particular nodes at the command of a network administrator or security incident responder. For example, the network administrator uses an administrator's device to connect to remote server (e.g., via a web interface or a client application provided by a service provider associated with the remote server) and manually selects the particular nodes using a network monitoring user interface. In some embodiments, the network monitoring user interface provides other functions, such as reviewing and modifying IOCs, queries, event artifacts, metrics and statistics for IOC evaluations and query responses, and performing sandbox investigation, etc.

In some embodiments, an event recorder is deployed on each node in the network that continuously records local values for particular indicator items (e.g., commonly used indicator items, such as filenames of newly created/modified/deleted/executed files, IP addresses of network connections, ports accessed, and processes started/killed, etc.) to a local event database. An administrator can query these local event databases from the network monitoring user interface by issuing questions to the network through the linear communication orbit. For example, the administrator's device can send the questions to the server of the network and the questions may be packaged in query messages and propagated to the nodes through the server of the network. Each node along the linear communication orbit will be able to quickly respond to these questions based on the past event data stored in their respective local event databases. After the answers have been collected from all relevant nodes in the network, the server of the network forwards the answers back to the administrator's device.

In some embodiments, after a direct duplex connection has been established between a particular node and the remote server, the administrator can also query the local event database of the particular node through the direction duplex connection. In addition, the administrator can take a snapshot of the local event database on the particular node and have it uploaded to the remote server, so that in-depth analysis regarding the particular node may be performed at the remote server (e.g., according to instructions provided by the administrator to the remote server).

In some embodiments, after a direct duplex connection has been established between a particular node and the remote server, the administrator can collect process artifacts from the particular node based on event history and file references for an event of interest identified by the administrator. The administrator can make a copy of the collected process artifacts and corresponding metadata (e.g., OS version, memory, installed apps, usernames, etc.) describing the local environment of the particular node, and use them to create a sandbox (e.g., choose the same operating environment as the particular endpoint machine and add the necessary files and libraries from the collected process artifacts) and recreate the past event(s) in the sandbox for investigation purposes.

In some embodiments, based on the in-depth analysis performed on a particular node, the administrator can select particular events or artifacts of interest in the network monitoring user interface and, in response, be presented with a set of sample questions that can be dispatched to the network for a network-wide analysis. The set of sample questions can be automatically generated based on existing question templates and indicator values that are found on the particular node. The automatic generation of the questions facilitates the investigative process of the administrator, and relieves the administrator from having to create the questions one by one from scratch. In some embodiments, the questions and IOCs for detecting a particular threat or event of interest can be refined (e.g., made more efficient or streamlined) based on the answers collected from the network.

FIGS. 2A-2B illustrate examples of specifications of indicators of compromise, where the specifications do not expressly provide a cost associated with the indicators of compromise.

FIG. 2A illustrates an IOC specification 200 which is intended to detect a reverse shell threat. A shell is a segment of code or program which can be used to gain code or command execution on a device. A reverse shell is a shell in which a targeted machine communicates back to an attacking machine.

In some embodiments, IOC specification 200 is a text file. For example, IOC specification 200 comprises XML, code in a text file. In some embodiments, the XML code is in the form of an Open IOC or STIX (Structured Threat Information Expression) file. In some embodiments, IOC specification 200 is in a tool specific format, such as Yara. In some embodiments, IOC specification 200 is obtained from a subscription intelligence source (e.g., an IOC feed). In some embodiments, IOC specification 200 is generated automatically.

In this example, IOC specification 200 is embodied as an XML file. IOC specification 200 includes a header 202 that specifies various metadata, such as a short description of the IOC (e.g., "CCAPP.EXE", delimited by <short_description> and </short_description>), a description of the IOC (e.g., "Custom Reverse shell.", delimited by <description> and </description>), and similarly specified author and author date fields. Thus, CCAPP.EXE is a shorthand name for a known reverse shell threat. In some embodiments, the metadata specified in header 202 is used in a graphical user interface which allows an administrator to select particular IOCs.

IOC specification 200 also includes an IOC definition 204 that specifies a set of observables (and optionally a logical relationship between the observables). Observation of the set of observables (e.g., specified by a set of indicator items) according to the logical relationship specified in the IOC definition 204 indicates the presence of the particular reverse shell threat used in this example (i.e., "CCAPP.EXE"). IOC definition 204 is delimited by <definition> and </definition> and includes two indicator items (indicator item 206-1 and indicator item 206-2). More specifically, indicator item 206-1 specifies an MD5 hash value of a file (e.g., by specifying the type of the indicator item as "MD5sum" and the value of the indicator item as "9855c23be2b6f38630756a277b52cdd2"); and indicator item 206-2 specifies a different MD5 hash value of a file (i.e., "acb81bee009b09b2a0688f05ea45851f"). Further, IOC specification 200 specifies an indicator operator OR 208 between indicator items 206-1 and 206-2. So IOC specification 200 specifies that there is a high probability that the CCAPP.EXE reverse shell threat exists in a set of files if either of the aforementioned MD5 hash values is found after applying an MD5 hash to each file in the set of files.

IOC specification 200 does not expressly include a cost (e.g., a computational cost). But in some embodiments, a computer evaluating IOC specification 200 determines a cost associated with IOC specification 200. In some embodiments, the computer evaluating (e.g., executing) IOC specification 200 determines (e.g., calculates) a sub-cost for each indicator item 206 of IOC specification 200 and determines (e.g., calculates) a cost for the IOC specification 200 as a whole by summing the respective sub-costs for each indicator item 206. In some embodiments, the computer evaluating IOC specification 200 determines a sub-cost for each indicator item in accordance with the type of the indicator item (e.g., the computer assigns a cost of 100 to MD5 hash evaluations and assigns a cost of 10 to file name evaluations).

FIG. 2B illustrates an IOC specification 210 which is analogous to IOC specification 200 with the following exceptions: IOC specification 210 includes a header 212 that is the same as header 202 except that the short description in header 212 is "CBAPP.EXE" rather than "CCAPP.EXE"; and IOC specification 210 includes IOC definition 214 that is the same as IOC definition 204 except that IOC definition 214 specifies an indicator operator AND 218 between indicator items 216-1 and 216-2. Indicator items 216-1 and 216-2 are otherwise analogous to indicator items 206-1 and 206-2, respectively.

Because indicator operator 218 is the logical operator AND, IOC specification 210 specifies that there is a high probability that the CBAPP.EXE reverse shell threat exists in a set of files if a file is found that has both the specified MD5 hash value and the specified file name.

Figure 3A:
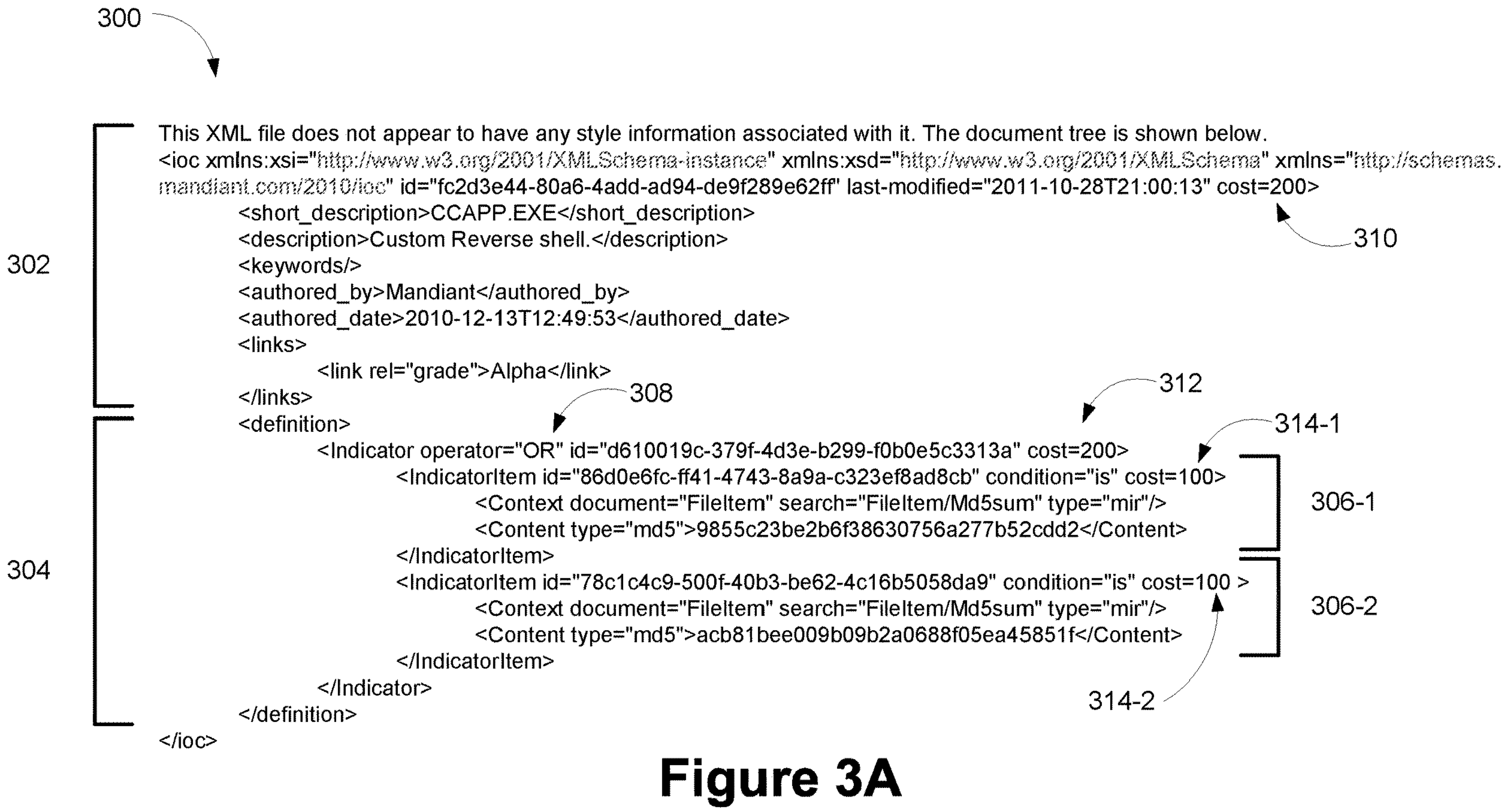
Figure 4B:
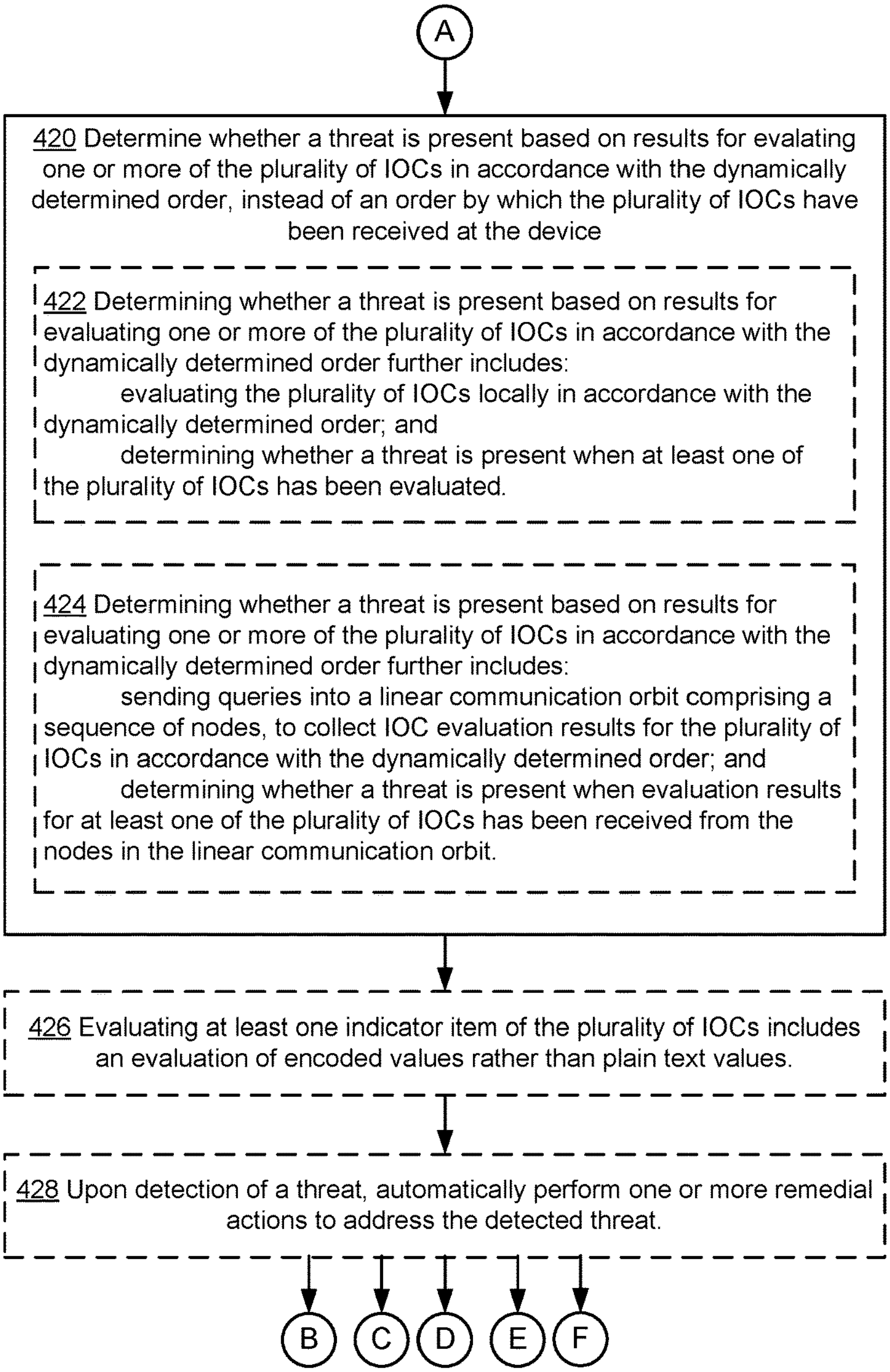
Figure 4C:
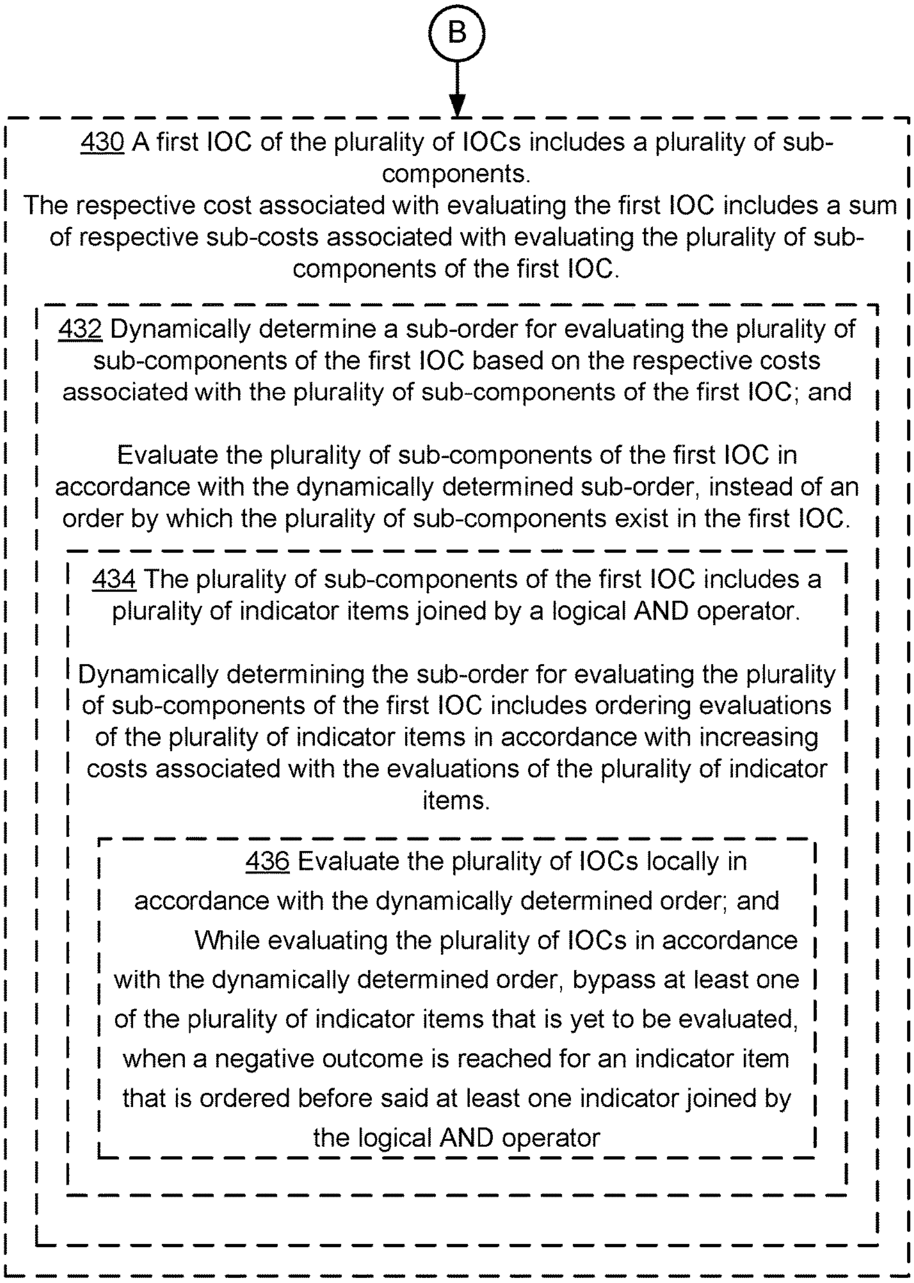
Figure 4D:
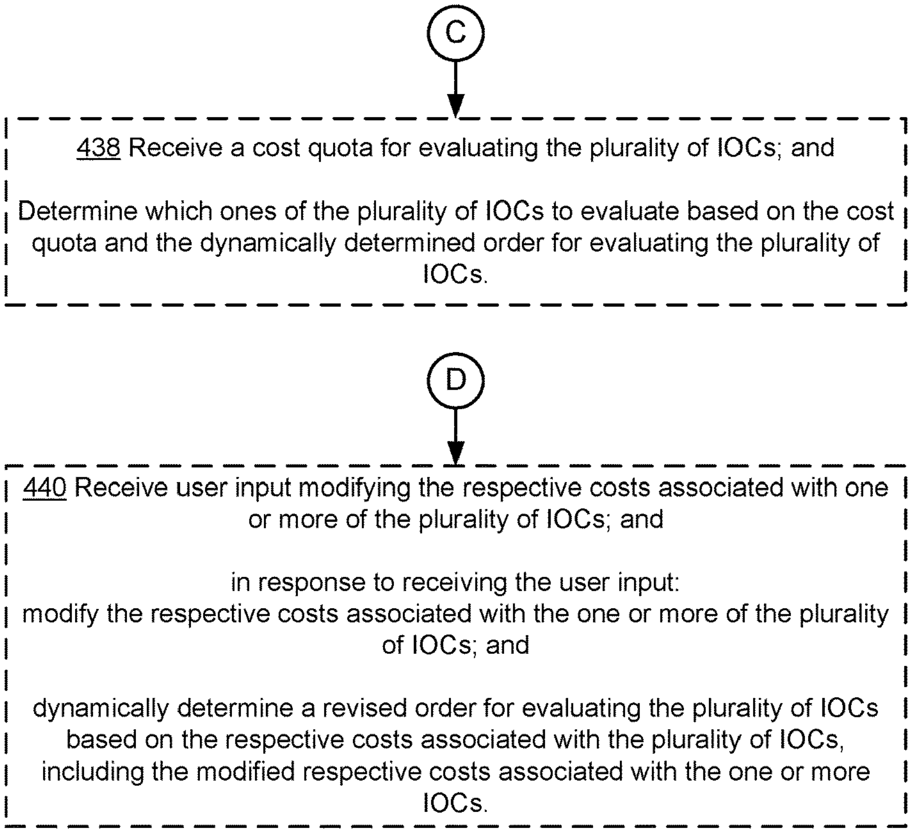
Figure 4E:
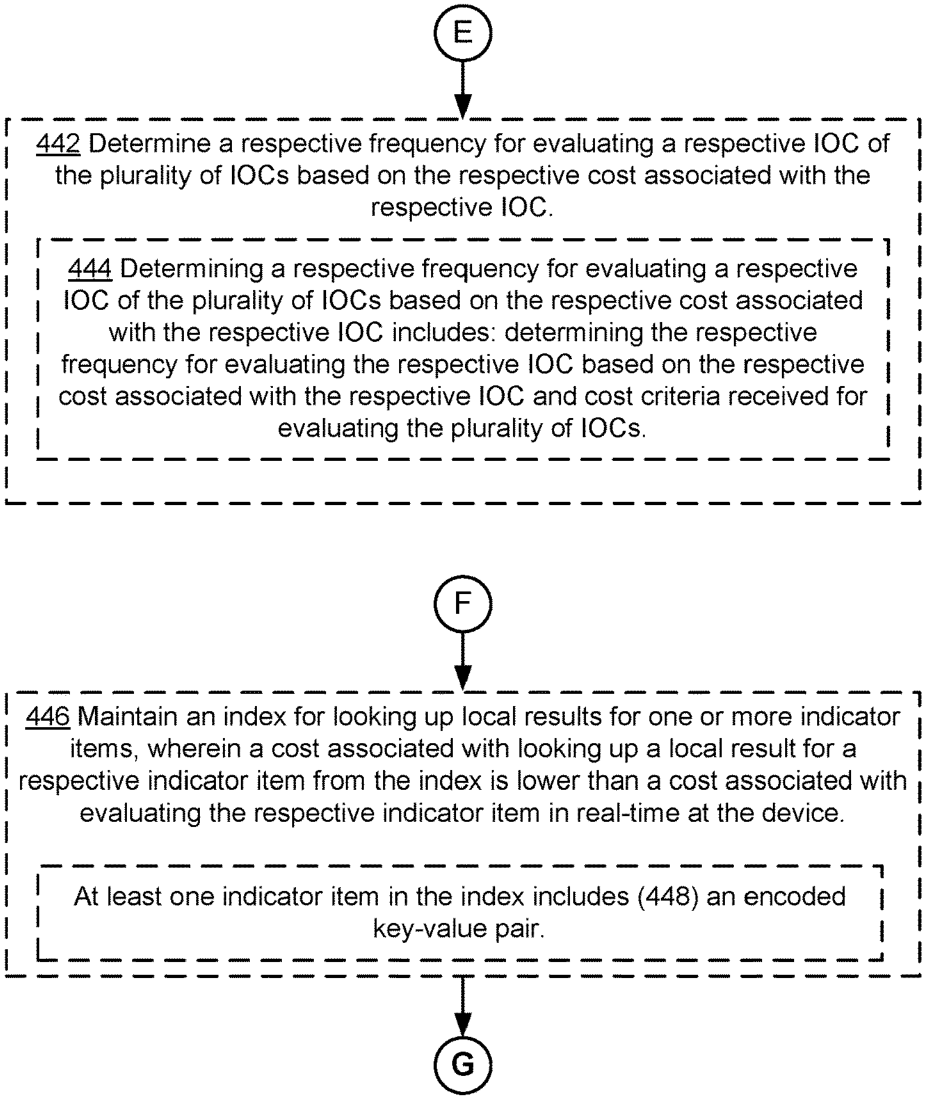
Figure 4F:
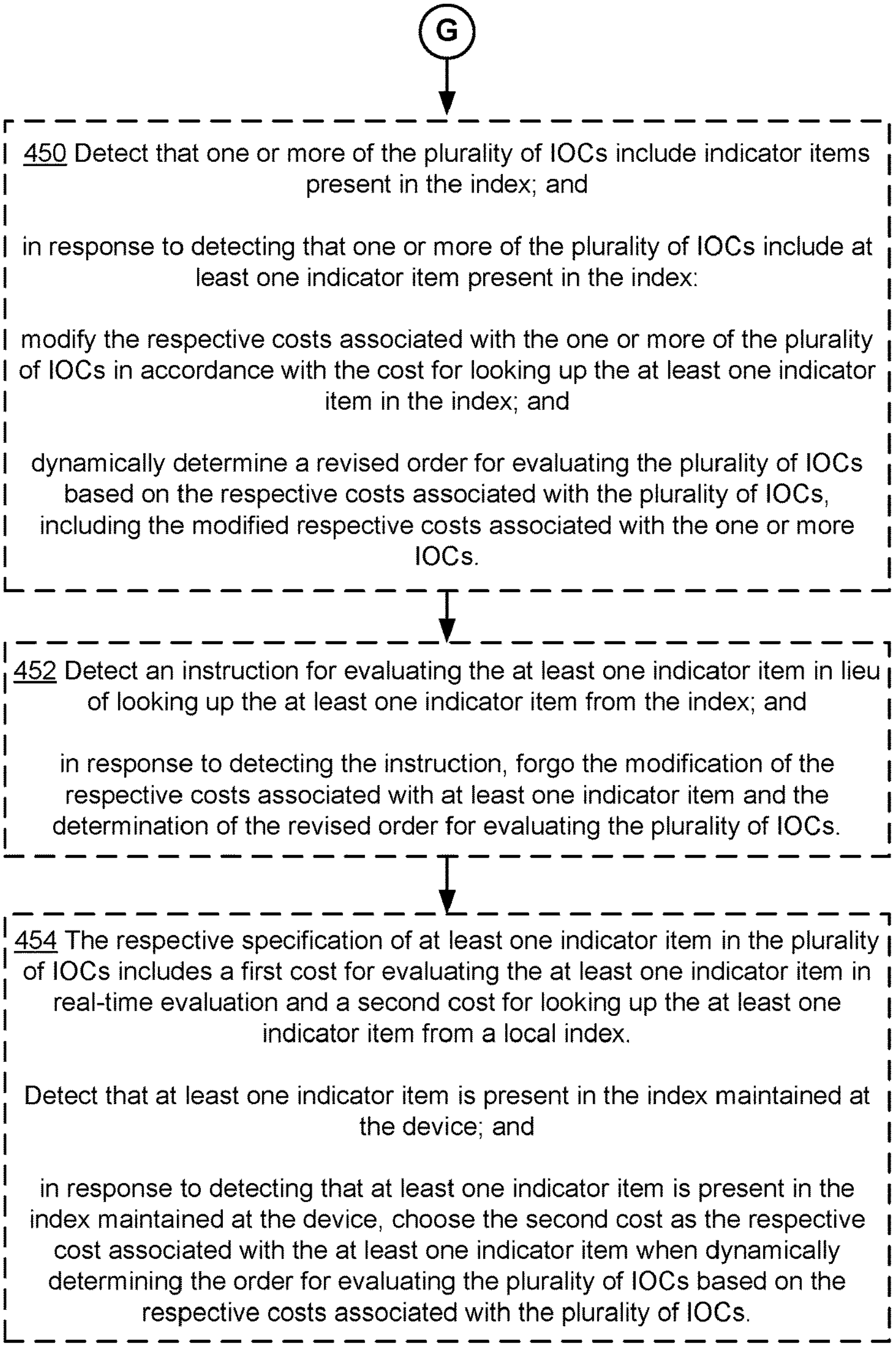

FIG. 3A illustrates an IOC specification 300 which is analogous to IOC specification 200 except that IOC specification 300 includes an expressly provided cost corresponding to the IOC. More particularly, IOC specification 300 includes a header 302 that is analogous to header 202 except that header 302 includes metadata 310 indicating the cost (e.g., the metadata can be used to display the cost to an administrator in a user interface). IOC specification 300 includes IOC definition 304 which is analogous to IOC definition 204 except that IOC definition 304 includes parameter 312 specifying the cost and, optionally, parameters 314 specifying sub-costs (e.g., parameter 314-1 specifying (corresponding to) a sub-cost for indicator item 306-1 and parameter 314-2 specifying (corresponding to) a sub-cost for indicator item 306-2). In this example, parameter 314-1 specifies a sub-cost of 100 corresponding to indicator item 306-1, and parameter 314-2 specifies a sub-cost of 100 corresponding to indicator item 306-2. In some embodiments, the cost expressed by parameter 312 (e.g., the cost for the entire IOC) is the sum of the costs specified in parameters 314-1 and 314-2. In some embodiments, parameter 312 is omitted from IOC specification 300 and the computer evaluating IOC specification 300 sums over the expressly provided sub-costs in order to determine a cost for the IOC as a whole (e.g., as a pre-processing operation before evaluating the IOC). IOC specification 300 includes indicator operator 308 specifying a logical operator OR between indicator item 306-1 and indicator item 306-2.

FIG. 3B illustrates an IOC specification 320 which is analogous to IOC specification 210 except that IOC specification 320 includes an expressly provided cost corresponding to the IOC. More particularly, IOC specification 320 includes a header 322 that is analogous to header 212 except that header 322 includes metadata 330 indicating the cost (e.g., the metadata can be used to display the cost to an administrator in a user interface). IOC specification 320 includes IOC definition 324 which is analogous to IOC definition 214 except that IOC definition 324 includes parameter 332 specifying the cost and, optionally, parameters 334 specifying sub-costs (e.g., parameter 334-1 specifying (corresponding to) a sub-cost for indicator item 326-1 and parameter 334-2 specifying (corresponding to) a sub-cost for indicator item 326-2). In this example, parameter 334-1 specifies a sub-cost of 100 corresponding to indicator item 326-1, and parameter 334-2 specifies a sub-cost of 10 corresponding to indicator item 326-2. In some embodiments, the cost expressed by parameter 332 (e.g., the cost for the entire IOC) is the sum of the sub-costs specified in parameters 334-1 and 334-2. In some embodiments, parameter 332 is omitted from IOC specification 320 and the computer evaluating IOC specification 320 sums over the expressly provided sub-costs in order to determine a cost for the IOC as a whole (e.g., as a pre-processing operation before evaluating the IOC). IOC specification includes indicator operator 328 specifying a logical operator AND between indicator item 326-1 and indicator item 326-2.

It should be noted that summing over the sub-costs of an IOC's sub-components gives a "worst case scenario" cost for an IOC. For example, because indicator item 326-1 and indicator item 326-2 are connected by an indicator operator AND (e.g., a logical operator AND), the total cost of 110 for the IOC assumes that the first indicator item that is evaluated (e.g., executed) returns a positive result (thus mandating evaluation of the second indicator item). In contrast, the worst case scenario cost for indicator items connected by a logical operator OR assumes that the first indicator item that is checked returns a negative result.

In some embodiments, the cost of evaluating an IOC is a best case scenario cost (e.g., the lowest costs among any of an IOC specification's indicator item sub-costs). In some embodiments, an administrator can configure whether the cost is a best case scenario cost, a worst case scenario cost, or something in between. For example, when a specific known threat is potentially catastrophic (e.g., a threat that will release customers' personal information), but is extremely unlikely to be present, there is good reason to use a best case scenario cost. Consider an IOC specification that provides both a "quick screen" for the known threat (e.g., a quick test that checks the file name of a file), and a more detailed and costly analysis (e.g., comprising a set of one or more indicator items) to be evaluated when the quick screen returns a positive result (i.e., a result indicating compromise). In some embodiments, the "quick screen" is a low cost, highly sensitive, indication of the threat (e.g., having a low Type-II (false negative) error rate) and the more detailed analysis is a high cost, highly specific, indication of the threat (e.g., having a low Type-I (false positive) error rate). In some embodiments, the IOC will be evaluated with a frequency inversely proportional to its costs. Therefore, in some circumstances, because of the reduced odds that both the quick screen and the more detailed analysis will need to be performed, an administrator will opt to use a best case scenario costs so as to screen for the threat more often.

As described below with respect to method 400, in some embodiments, indicator items 326 are re-ordered for evaluation, from the order in which they are received (e.g., the order in which they appear in IOC specification 320: indicator item 326-1 first and then indicator item 326-2), to an order based on cost. For example, indicator items 326 are re-ordered for evaluation such that the lower cost indicator item (i.e., indicator item 326-2) is evaluated before the higher cost indicator item (i.e., indicator item 326-1). In some embodiments, evaluation of IOC specification 320 is terminated when either indicator item 326 returns a negative result (because indicator items 326 are connected with a logical operator AND) whereas evaluation of IOC specification 300 is terminated when either indicator item 306 returns a positive result (because indicator items 306 are connected with a logical operator OR).

FIG. 3C illustrates an encoded specification 346 for a single observable (called an indicator item), in accordance with some embodiments. In some circumstances, IOC specifications are published openly (e.g., an administrator can download open IOC specifications from the web). These IOC specifications are equally available to hackers who have coded the very threats that the IOC specifications are attempting to detect. If not encoded in the IOC specifications, the hackers are thus able to see what signatures of their threats are being detected and change those signatures. For example, a file name can easily be changed from "CCAPP.EXE" to "CTAPP.EXE", which would evade detection of an indicator item looking for a threat with the file name "CCAPP.EXE". Thus, indicator item 346 specifies that the evaluating computer should apply an MD5 hash to the names of the files it is checking. The indicator item 346 does not specify the filename that it is looking for, but specifies that the MD5 hash value for that file name is "CAA19D52FDB8E1151F378F7C4BF62F76". This makes it more difficult for hackers to modify their threats to avoid detection.

FIGS. 4A-4F illustrate a flow chart of an exemplary method 400 for threat management (e.g., including determining whether a threat is present based on results for evaluating indicators of compromise in accordance with, or prioritized according to, a cost associated with the respective indicators of compromise). As used herein, the term "indicator of compromise" means an observable (e.g., an artifact)—or a set of observables—on a computer, computer network, or operating system that indicates a threat (e.g., a known threat, an intrusion) of that computer, computer network, or operating system. Some IOCs indicate the presence of a computer virus or malware. Specific examples of IOCs include virus signatures, IP addresses, hashes of malware files (e.g. values of MD5 hashes), and URLs of botnet command and control servers.

In some embodiments, an IOC indicates a high probability of compromise. Detection of an IOC need not indicate with 100% certainty that an intrusion has occurred. Instead, in some circumstances, detection of an IOC indicates that additional forensics (e.g., deep investigation) is warranted.

Method 400 is performed at a device (e.g., a device or system illustrated in FIG. 5 or 6, and discussed below) having one or more processors and memory. In some embodiments, the device is a node (e.g., any node) in a linear communication orbit, as described above with reference to FIG. 1 (e.g., node 102) and FIG. 5 (e.g., machine 500). In some embodiments, the device is a server in a linear communication orbit, as described above with reference to FIG. 1 (e.g., server 108) and FIG. 6 (e.g., machine 600). In some embodiments, the device is a node (e.g., a leaf node) or a server in a hub-and-spoke network architecture. In some embodiments, the device is a standalone computer.

Other details and variations of method 400 are provided earlier in the specification. Various combinations of the features described in the specification are possible and are apparent to persons of ordinary skill in the art in light of the disclosure provided herein. Thus, method 400 may be combined with one or more other aspects described above in various embodiments.

The device receives (402) respective specifications of a plurality of indicators of compromise (IOCs). In some embodiments, the plurality of IOCs are a plurality of IOCs to be evaluated. In some embodiments, receiving the respective specifications of the plurality of IOCs includes receiving a plurality of IOC files (e.g., the files shown in FIGS. 2A-2B and FIGS. 3A-3B). In some embodiments, each IOC file includes a single IOC. In some embodiments, each IOC file includes one or more IOCs. For example, an IOC file will include a list of IOC specifications.

A "specification of an IOC" (or "IOC specification") is used herein to refer to instructions for evaluating an IOC (e.g., instructions in a computer language, such as XML, that is capable of being translated into machine-readable code). In some embodiments, an IOC specification is a computer file that includes, for each of one or more observables: a type of the observable (e.g., a file name, an MD5 hash) and a value for the observable (e.g., "CCAPP.EXE" when the type of the observable is a file name, an MD5 hash value when the type of the observable is a MD5 hash). In some embodiments, the specification includes logical operators (e.g., indicator operator 218, FIG. 2B) connecting the one or more observables (e.g., a logical operator AND, a logical operator OR).

The specification for a single observable is sometimes referred to herein as an indicator item. When an IOC includes a list of indicator items and a single logical operator AND, compromise is indicated only when all of the indicator items are present. When the IOC includes a list of indicator items and a single logical operator OR, compromise is indicated when any of the indicator items are present.

As a more specific example, IOC specification 300 (FIG. 3A) specifies a set of observables indicative of the CCAPP.EXE threat (e.g., a specific or known threat which IOC specification 300 is designed to detect). IOC specification 300 includes two indicator items (i.e., indicator item 306-1 and indicator item 306-2). Indicator item 306-1 specifies an MD5 hash value of a file ("9855c23be2b6f38630756a277b52cdd2") and indicator item 306-2 specifies a different MD5 hash value of a file ("acb81bee009b09b2a0688f05ea45851f"). IOC specification 300 specifies an indicator operator OR 218 that provides the logical relationship between indicator item 306-1 and indicator item 306-2. So IOC specification 300 returns a positive result for a set of files (e.g., indicating a high probability that the CCAPP.EXE threat exists in the set of files) if either of the aforementioned MD5 hash values is found after applying an MD5 hash to each file in the set of files.

In some embodiments, the specification of each IOC of the plurality of IOCs includes a cost associated with evaluating the IOC. In some embodiments, the cost is expressed as (e.g., assigned by) a parameter for a block of IOC code (e.g., a parameter for the entire IOC specification and/or a parameter for an indicator item of the IOC specification). For example, FIGS. 3A-3B illustrate IOC specifications that include a respective cost associated with evaluating an IOC (e.g., parameter 332, FIG. 3A, provides a cost for the entire IOC specification) and respective costs for indicator items within the IOC (e.g., parameter 334-1 which provides a cost for indicator item 326-1). In some embodiments, the cost for an IOC is specified by a user through a user interface. In some embodiments, the same cost is used for an IOC for different nodes in the linear communication orbit, while in some other embodiments different cost values are used an IOC for different nodes in the linear communication orbit. In some embodiments, the cost of an IOC is supplied by a server to a node in the IOC specification. In some embodiments, the server specifies instructions (e.g., a formula) for calculating the cost for an IOC in the IOC specification and the cost is calculated on the fly at a node based on the instructions. In some embodiments, the cost for a particular IOC or indicator item is calculated based on the local computing environment (e.g., available computing power, memory, competing processes, etc.) at the node. In some embodiments, the cost for a particular IOC is calculated based on historic computing costs associated with evaluating the particular IOC or indicator item at the node, or an average cost across a specified set of two or more nodes.

In some embodiments, a subset of an IOC specification (e.g., less than the entire IOC specification) that has an associated (e.g., specified) sub-cost is called a sub-component. In some embodiments, a sub-component is the smallest block of an IOC specification that has an associated sub-cost. In some circumstances, a sub-component is an indicator item (e.g., a specification for a single observable). In some embodiments, a sub-component comprises a set of indicator items (e.g., a sub-component comprises a plurality of indicator items that have a sub-cost associated with their collective evaluation). In some embodiments, or for some IOCs, the cost associated with evaluating the IOC is the sum of sub-costs associated with evaluating the plurality of sub-components of the IOC.

However, for some IOCs, the cost associated with evaluating the IOC is not the sum of sub-costs associated with evaluating the plurality of sub-components of the IOC. For example, in some IOCs, the analysis or computation required to evaluate a first sub-component of the IOC largely overlaps with the analysis or computation required to evaluate a second sub-component of the IOC, and thus once the first sub-component has been evaluated, the cost of evaluating the second sub-component is much less than the cost of evaluating the second component by itself. In a more specific example, if the first sub-component and second sub-component of the IOC identify two potential values as the outcome of the same computation, then the computation need not be repeated twice in order to evaluate both the first and second sub-components; rather, the computation is performed once, and the outcome is compared with value identified by the first sub-component, and if that result is negative, then it is compared with the value identified by the second sub-component. Further, in the evaluation of some IOCs, an intermediate result produced during the evaluation of one sub-component of the IOC can be used during the evaluation of another sub-component of the IOC, thereby resulting in a total cost that is less than the sum of the individual costs of evaluating each of the sub-components of the IOC.

In some embodiments, the method includes assigning (e.g., deriving) a cost for an IOC based on its IOC specification (e.g., based on the operations that the device has to perform in order to evaluate the IOC). Consider, as an example, an IOC that consists of instructions to evaluate an MD5 hash of a file. In some embodiments, the cost of evaluating the IOC is not expressly provided in the IOC specification, but the device assigns a cost of "100" to MD5 hash evaluations. Thus, a cost of "100" is assigned to the IOC by the device. FIGS. 2A-2B illustrate IOC specifications that lack expressly indicated costs. But nevertheless, a cost can be ascertained from the IOC specifications shown in FIGS. 2A-2B.

In some embodiments, receiving the respective specifications of the plurality of IOCs includes (404) parsing one or more IOC files that include the respective specifications of the plurality of IOCs. For example, FIGS. 3A-3B illustrate XML files, each containing the specification for a single IOC. In some embodiments, the device parses both the XML file illustrated in FIG. 3A and the XML file in FIG. 3B to obtain the plurality of IOCs (e.g., two IOCs, in this example). For example, in some embodiments, the device is a server of a linear communication orbit, and the server subscribes to a number of IOC feeds, and receives IOC files from time to time for different known threats. The server parses the IOC files received from the feeds and identifies the different IOCs or indicator items that need to be evaluated from the files. In some embodiments, the server generates respective queries in accordance with the identified IOCs and indicator items for injecting into the network through the linear communication orbit; and the nodes receiving the queries perform the IOC evaluations and send back responses to the server through the linear communication orbit. In some embodiments, the device is a node and the node parses the IOC files received from the server or other sources (e.g., third-party feeds, or a user) to identify the IOCs that need to be evaluated for threat detection.

In some embodiments, receiving the respective specifications of the plurality of IOCs includes (406) receiving identifications of the plurality of IOCs through user selections in a user interface (e.g., the IOCs are selected by check boxes in an administrator's user interface to be evaluated at one or more nodes in the network or at a node that is directly connected to a server and is under deep investigation). In some embodiments, the user-selected IOCs are then injected into the network as queries through the linear communication orbit and evaluated at multiple nodes in the network. In some embodiments, the user-selected IOCs are evaluated locally at one or more designated nodes (e.g., the local computer, or one or more nodes that are under deep investigation).

In some embodiments, receiving the respective specifications of the plurality of IOCs includes (408) receiving the respective specifications of the plurality of IOCs from a server through a neighboring node in a linear communication orbit (e.g., the IOC is propagated as queries in the linear communication orbit during a network-wide survey). For example, the device is node 102*c* (FIG. 1) and the plurality of IOCs are received from server 108 through the linear communication orbit 106 (e.g., the plurality of IOCs is passed through node 102*b* and node 102*c* before reaching node 102*d*). For example, in some embodiments, the server receives IOC files or selection of IOCs from a user through a user interface (e.g., a web interface or an application user interface), and generates queries (e.g., questions that asks for values of particular indicator items, and/or instructions for evaluating one or more IOCs) based on the IOC files and/or user selections. The queries optionally specify which nodes should perform the IOC evaluations and respond to the queries. When a node receives the query passed from its upstream neighbor, the node determines whether it should perform the evaluation based on the criteria set forth in the query. The node also sends the query further downstream along the linear communication orbit, e.g., after it has appended its answer to the query. Further details regarding propagation of queries along the linear communication orbit are provided, for example, U.S. patent application Ser. No. 13/797,946, filed Mar. 12, 2013, titled "System and Network Management Using Self-Organizing Communication Orbits in Distributed Networks," which is hereby incorporated by reference in its entirety.

In some embodiments, the plurality of IOCs are (410) extracted from multiple IOC files (and/or IOC feeds) at the server and sent to the device as individual queries (e.g., the server can break apart one or more IOC files and only request that certain indicator items be evaluated). For example, in some embodiments, the server optionally sends out certain identified IOCs (e.g., indicator items that tend to change more frequently and/or indicator items that are relevant to multiple threats) with higher frequencies than other IOCs, such that the identified IOCs they are evaluated by the nodes in the linear communication orbit more frequently than other IOCs. In some embodiments, the server collects answers for the queries from multiple nodes and determines whether there is a threat in the network based on the answers collected from multiple nodes in the network. For example, if more than a threshold number of nodes reported that they had detected a file with the name "panda.exe", the server would determine that "panda.exe" may be a virus that has spread to multiple machines in the network. In some embodiments, the server consolidates the same or similar indicator items from multiple IOCs into the same query, so that the same evaluation is not duplicated needlessly.

In some embodiments, the respective cost associated with evaluating the IOC is (412) predicted (e.g., assigned) based on a local environment at the device (e.g., based on local memory, processing power, bandwidth, etc.). In some embodiments, the cost is modified from a nominal computing cost, based on an importance or critical level of the IOC. For example, the cost associated with an IOC may be reduced from its nominal computing cost if the IOC indicates a highly dangerous, common, or otherwise exigent threat. As described below, in some embodiments, lowering the cost associated with the IOC will result in the IOC being evaluated more often. Thus, in these embodiments, the device checks for more important threats (e.g., evaluates more important IOCs) more often than the device otherwise would (e.g., based solely on the nominal computing costs of the IOCs). In some embodiments, the prediction of the respective cost associated with evaluating the IOC is performed by the server. In some embodiments, prediction of the respective cost associated with evaluating the IOC is performed by individual nodes.

In some embodiments, the respective cost associated with evaluating the IOC is (414) predicted (e.g., assigned) based on historic evaluation data (e.g., the time and resources used for evaluating the same IOC (or a similar IOC) in the past). For example, an IOC specification may include instructions that cause the device to generate MD5 hashes of all the files in a particular directory (i.e., to generate an MD5 hash for each individual file in the directory). In some embodiments, the respective cost associated with evaluating the IOC is predicted based on how much computing power was required the last time the device evaluated the IOC (e.g., based on how much time was required to evaluate the IOC, or how many calculations the device needed to perform to evaluate the IOC). In some embodiments, the respective cost is predicted based on historical evaluation data from the last N evaluations of the IOC (e.g., where N is an integer greater than or equal to 1, such as an integer in the range of 2 to 20). In some embodiments, the prediction of the respective cost associated with evaluating the IOC is based on the historic evaluation data for a particular node. In some embodiments, prediction of the respective cost associated with evaluating the IOC is based on the historic evaluation data across multiple nodes in the network, e.g., based on the average computing power and time used to perform the IOC evaluation by the multiple nodes.

The device dynamically determines (416) an order for evaluating the plurality of IOCs based on the respective costs associated with the plurality of IOCs (e.g., in order of increasing cost, which is different from the order in which the plurality of IOCs were received). In some embodiments, the device dynamically determines the order without user intervention (e.g., the user specifies the IOCs to be evaluated, but the device automatically, without user intervention, determines the order in which the specified IOCs will be evaluated). In some embodiments, dynamically determining the order means automatically re-ordering the IOCs whenever a change is made to the plurality of IOCs. For example, in some embodiments, the IOCs are re-ordered when an IOC is added to the plurality of IOCs or whenever one or more costs associated with an IOC are modified (e.g., due to change in the local computing resource pool).

In some embodiments, the device is the server and the server determines which IOCs should be evaluated before others based on the respective costs associated with the plurality of IOCs, and sends out the queries generated for the IOCs into the network at different times accordingly. When individual nodes in the network receive the queries, the individual nodes perform the evaluation in response to the queries as they are received, and send the query further downstream with results of the evaluation appended to the query. Eventually the aggregated results are received at the server and the server determines if a threat is present in the network and which nodes are affected based on the received results. In some embodiments, the server optionally sends out instructions for one or more remedial actions to the affected nodes through the linear communication orbit. Examples of remedial actions are provided above.

In some embodiments, the device is a node, and when the node receives the plurality of IOCs, the node dynamically determines which IOCs should be evaluated before others based on the respective costs associated with the plurality of IOCs. After the node performs the evaluation of an IOC, or a set of IOCs, the node optionally sends back results of the evaluation to the server, either directly or through the linear communication orbit. In some embodiments, the server determines if a threat is present in the network and whether the node is affected based on the received results. In some embodiments, the server optionally sends out instructions for one or more remedial actions to the affected node through the linear communication orbit, and the node performs the remedial actions accordingly. In some embodiments, the node determines whether a threat has been detected locally, and optionally, automatically carries out one or more default remedial actions. Examples of remedial actions are provided above.

In some embodiments, dynamically determining an order for evaluating the plurality of IOCs based on the respective costs associated with the plurality of IOCs includes (418): ordering the plurality of IOCs based on increasing costs (e.g., lower cost evaluations are performed first).

The device determines (420) whether a threat is present based on results for evaluating one or more of the plurality of IOCs (i.e., based on the results obtained by evaluating one or more of the plurality of IOCs) in accordance with the dynamically determined order, instead of an order by which the plurality of IOCs have been received at the device.

In some embodiments, determining whether a threat is present based on results for evaluating one or more of the plurality of IOCs in accordance with the dynamically determined order further includes (422): evaluating the plurality of IOCs locally in accordance with the dynamically determined order; and determining whether a threat is present when at least one of the plurality of IOCs has been evaluated. For example, in some embodiments, the device is a node and the node evaluates one or more of the plurality of IOCs in accordance with the dynamically determined order, instead of an order by which the plurality of IOCs have been received at the node. In some embodiments, the server may send out queries for IOCs in one order, and individual nodes dynamically determine a cost-based order locally, and perform evaluation in accordance to the locally determined order. Since cost may be different for different nodes in the network, the different nodes may perform the IOC evaluation in different orders. In addition, different nodes may report the detection of a threat and/or perform one or more remedial actions after different subsets of the IOCs have been performed.

In some embodiments, determining whether a threat is present based on results for evaluating one or more of the plurality of IOCs in accordance with the dynamically determined order further includes (424): sending queries into a linear communication orbit comprising a sequence of nodes, to collect IOC evaluation results for the plurality of IOCs in accordance with the dynamically determined order (i.e., the determined order for evaluating IOCs); and determining whether a threat is present when evaluation results for at least one of the plurality of IOCs has been received from the nodes in the linear communication orbit. For example, in some embodiments, the device is the server, and the server sends out the IOCs as queries in accordance with the dynamically determined order, and consequently receives results for evaluating the one or more IOCs in accordance with the dynamically determined order as well. The server then determines whether a threat is present based on results for evaluating one or more of the plurality of IOCs in accordance with the dynamically determined order. As discussed above, in some embodiments, IOC evaluation results are collected from only from nodes in the linear communication orbit that meet predefined filter criteria.

In some embodiments, the device evaluates a sequence (e.g., a first subset) of the plurality of IOCs. In some embodiments, the device forgoes evaluating a second subset (e.g., the remaining IOCs in the plurality of IOCs) based on cost. In some embodiments, as described below, the device has an IOC cost quota (e.g., an IOC budget), and the device evaluates as many of the plurality of IOCs as possible given the cost quota, prioritizing the plurality of IOCs based on the re-ordered list. The device forgoes evaluating the remaining IOCs in the plurality of IOCs.

In some embodiments, evaluating at least one indicator item of the plurality of IOCs includes (426) an evaluation of encoded value(s) (e.g., a comparison of MD5 hash values) rather than plain text value(s). For example, in some circumstances, IOC specifications are published openly (e.g., an administrator can download IOC specifications from the web). As described above, these IOC specifications are equally available to hackers who have coded the very threats the IOC specifications are attempting to detect. If not encoded in the IOC specifications, the hackers are thus able to see what signatures of their threats are being detected and change those signatures. Thus, encoding values specified in indicator items makes it more difficult for hackers to modify their threats to avoid detection.

To that end, in some embodiments, the IOC specification includes (e.g., specifies) the encoded values (e.g., indicator item 346, FIG. 3C). In some embodiments, the value specified by the indicator item is an encoded value of an observable (e.g., a file, a file name, a URL, an IP address). In some embodiments, the encoding is a one-way hash (e.g., a cryptographic hash) of an observable. In some embodiments, the encoding is done by a fingerprint function (sometimes called a message digest, or a compression function) that receives a variable-length observable input (e.g., a file) and produces a fixed length output (e.g., an MD5 hash that produces a 128-bit hash value).

In some embodiments, upon detection of a threat, the device automatically performs (428) one or more remedial actions to address the detected threat. In some embodiments, the device is the server, and the server sends out instructions to address the detected threat in one or more communication messages, and the one or more communication messages is propagated to the affected node through the linear communication orbit. In some embodiments, the server sends out instructions to address the detected threat directly to the affected nodes, e.g., through a direct communication channel. In some embodiments, the device is a node, and the node automatically reports the detected threat and/or performs one or more default remedial actions (e.g., reporting the threat through the linear communication orbit, and/or automatically quarantining the offending processes or files, and/or collecting local artifacts and store them locally and uploading them to a server upon request).

In some embodiments, a first IOC of the plurality of IOCs includes (430) a plurality of sub-components (e.g., a plurality of indicator items joined by a logical expression (e.g., ((I1 AND I2) OR I3)) specifying logical operators (e.g., two or more operators selected from the set consisting of AND, OR, NOT, NOR, NAND, and XOR) that apply between respective indicator items). In some embodiments, the respective cost associated with evaluating the first IOC includes a sum of respective sub-costs associated with evaluating the plurality of sub-components of the first IOC. As described above, in some circumstances, summing over the respective sub-costs provides a "worst case scenario" cost for the IOC. In some embodiments, the respective cost associated with evaluating the first IOC includes something other than the worst case scenario cost, such as a "best case scenario" cost (e.g., a sum or other combination of the lowest sub-costs within the plurality of sub-components) or something in between (e.g., an average cost based on the average number of sub-components that need to be evaluated before the device is able to return a definite result).

In some embodiments, the device dynamically determines (434) a sub-order for evaluating the plurality of sub-components of the first IOC based on the respective sub-costs associated with the plurality of sub-components of the first IOC (e.g., an order different than the order in which the sub-components appear in the first IOC's specification). The device evaluates the plurality of sub-components of the first IOC in accordance with the dynamically determined sub-order, instead of an order by which the plurality of sub-components exist in the first IOC.

In some embodiments, an IOC is selectively evaluated, for example, in response to a local execution command or when the IOC is due for regularly scheduled evaluation (e.g., with a frequency of evaluation determined in accordance with the IOC's costs). In some embodiments, the device re-orders the IOC's sub-components when the IOC is selectively evaluated.

In some embodiments, the plurality of sub-components of the first IOC includes a plurality of indicator items joined by a logical AND operator. Dynamically determining the sub-order for evaluating the plurality of sub-components of the first IOC includes (434) ordering evaluations of the plurality of indicator items in accordance with increasing sub-costs associated with the evaluations of the plurality of indicators items.

In some embodiments, the device evaluates (436) the plurality of IOCs locally in accordance with the dynamically determined order; and while evaluating the plurality of IOCs in accordance with the dynamically determined order, bypasses (e.g., forgoes evaluating) at least one of the plurality of indicator items that is yet to be evaluated, when a negative outcome is reached for an indicator item that is ordered before said at least one indicator joined by the AND operator. In some embodiments, the device bypasses (e.g., forgoes evaluating) at least one of the plurality of indicator items that is yet to be evaluated, when a positive outcome is reached for an indicator item that is ordered before said at least one indicator joined by the OR operator.

In some embodiments, the device uses a cost quota (e.g., IOC budget) to limit performance of high cost evaluations. To that end, in some embodiments, the device receives (438) a cost quota for evaluating the plurality of IOCs, and when evaluating one or more of the plurality of IOCs in accordance with the dynamically determined order, the device determines which ones of the plurality of IOCs to evaluate based on the cost quota and the dynamically determined order for evaluating the plurality of IOCs. In some embodiments, the cost quota is based on a schedule (e.g., the device has a larger cost quota on weekends, when the network faces reduced demand from users).

In some embodiments, a user (e.g., a network administrator) may manually revise costs, and the manual revision of cost triggers re-evaluation of the order for evaluating the IOCs. To that end, in some embodiments, the device receives (440) user input modifying the respective costs associated with one or more of the plurality of IOCs. In response to receiving the user input: the device modifies the respective costs associated with the one or more of the plurality of IOCs; and dynamically determines (e.g., automatically, without further user input beyond the input modifying the respective cost) a revised order for evaluating the plurality of IOCs based on the respective costs associated with the plurality of IOCs, including the modified respective costs associated with the one or more IOCs.

In some embodiments, the device determines (442) a respective frequency for evaluating a respective IOC of the plurality of IOCs based on the respective cost associated with the respective IOC. In some embodiments, an IOC with a high cost is evaluated less frequently than an IOC with a low cost. In some embodiments, the respective frequency is inversely proportional to the cost (e.g., an IOC with a cost of 10 is evaluated five times as frequently as an IOC with a cost of 50).

In some embodiments, determining a respective frequency for evaluating a respective IOC of the plurality of IOCs based on the respective cost associated with the respective IOC includes (444): determining the respective frequency for evaluating the respective IOC based on the respective cost associated with the respective IOC and cost criteria received for evaluating the plurality of IOCs (e.g., the device evaluates IOCs with individual evaluation costs equal to 300 or less once per day, including weekdays and weekend days, and evaluates IOCs with evaluation costs above 300 once each weekend (i.e., once per week, on the weekend).

In some embodiments, the device maintains (446) an index for looking up local results for one or more indicator items, wherein a cost associated with looking up a local result for a respective indicator item from the index is lower than a cost associated with evaluating the respective indicator item in real-time at the device. In some embodiments, the index stores indicator item evaluation results for a particular file or set of files (e.g., a positive result or negative result for each file). In some embodiments, the index stores the evaluated values specified in the indicator item for the file or the set of files (e.g., stores MD5 hash values for the set of files, so that the device does not have to repeat the MD5 hash evaluation each time the indicator item is executed). In some embodiments, when the indicator item result is indexed for a particular file, the device uses a fixed cost (e.g., 5) for that indicator item when determining or estimating the cost of evaluating the IOC, regardless of the cost of evaluating the respective indicator item in real-time at the device (i.e., without looking up the local result in an index or the like). For example, the cost of looking up a local result for an indicator item is the same fixed value regardless of whether the indicator item specifies evaluation of a file name or an MD5 hash value.

In some embodiments, at least one indicator item in the index includes (448) an encoded key-value pair.

In some embodiments, the device detects (450) that one or more of the plurality of IOCs include indicator items present in the index. In response to detecting that one or more of the plurality of IOCs include at least one indicator item present in the index: the device modifies the respective costs associated with the one or more of the plurality of IOCs in accordance with the cost for looking up the at least one indicator item in the index; and dynamically determines a revised order for evaluating the plurality of IOCs based on the respective costs associated with the plurality of IOCs, including the modified respective costs associated with the one or more IOCs. In some embodiments, there is a cost associated with looking up an indicator item in the index (e.g., a cost associated with retrieving a value corresponding to an indicator item's key). In some embodiments, in accordance with a determination that a respective indicator item is present in the index, the device modifies the cost for the respective indicator item by subtracting the cost of evaluating the indicator item and adding the lookup cost. In some embodiments, the cost of evaluating the indicator item includes a cost for determining whether a local value for the indicator item is present in the index (e.g., a cost of determining the indicator item's key and searching the index for the key).

In some embodiments, the device detects (452) an instruction for evaluating the at least one indicator item in lieu of looking up the at least one indicator item from the index (e.g., when the index may be corrupted or not sufficiently up-to-date for the evaluation in question). In response to detecting the instruction, the device forgoes the modification of the respective costs associated with at least one indicator item and the determination of the revised order for evaluating the plurality of IOCs.

In some embodiments, the respective specification of at least one indicator item in the plurality of IOCs includes (454) a first cost for evaluating the at least one indicator item in real-time evaluation and a second cost for looking up a local value for the at least one indicator item from a local index. The device determines whether the at least one indicator item is present in the index maintained at the device. In response to detecting that the at least one indicator item is present in the index maintained at the device, the device chooses the second cost as the respective cost associated with the at least one indicator item when dynamically determining the order for evaluating the plurality of IOCs based on the respective costs associated with the plurality of IOCs.

Figure 5:
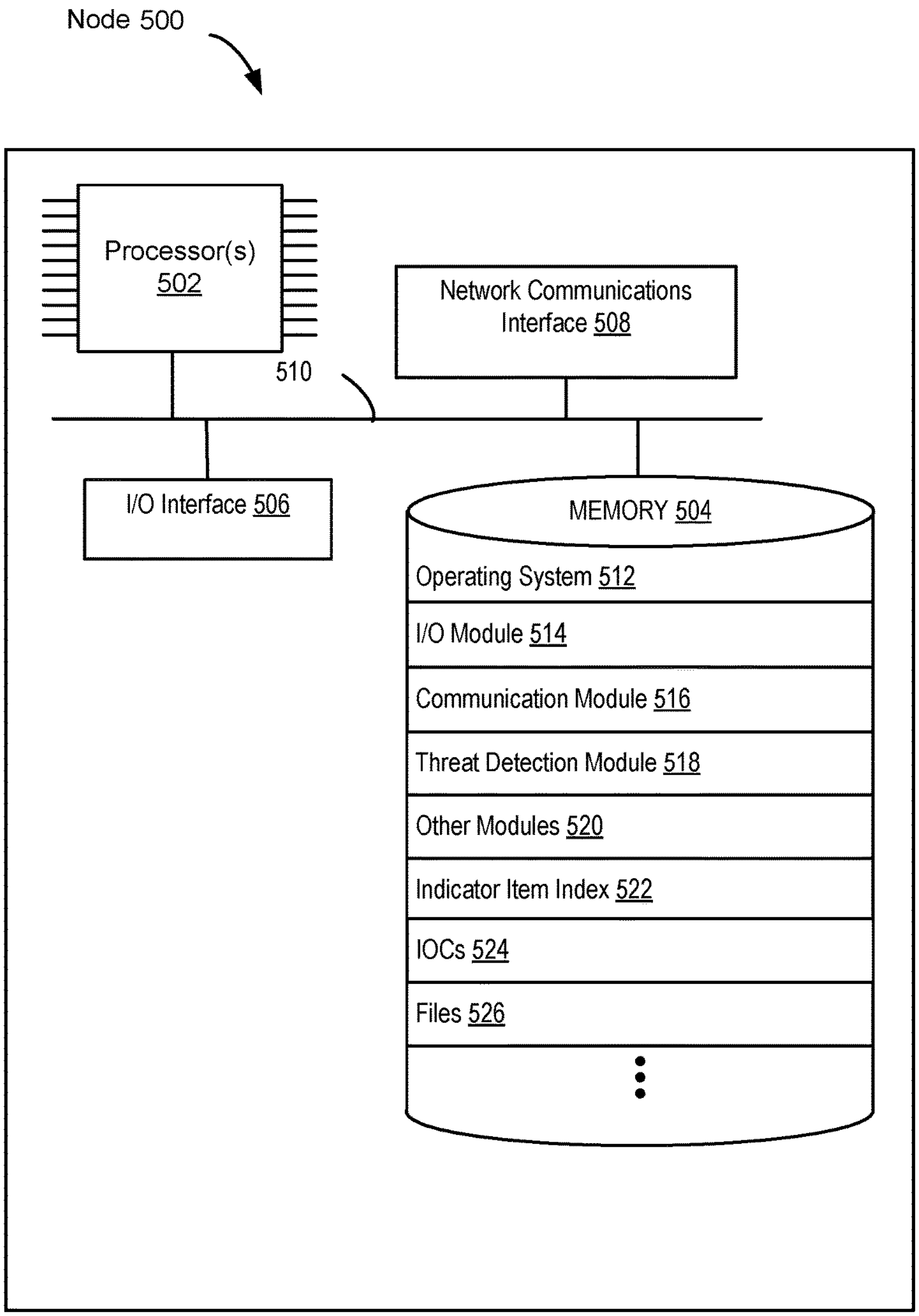
FIG. 5 is a block diagram of a system (e.g., an exemplary node) in a linear communication orbit, in accordance with some embodiments.

FIG. 5 is a block diagram of an exemplary machine 500 (e.g., serving as a node 102 shown in FIG. 1). In some implementations, machine 500 includes one or more processors 502, memory 504 for storing programs and instructions for execution by one or more processors 502, one or more communications interfaces such as input/output interface 506 and network interface 508, and one or more communications buses 510 for interconnecting these components.

In some embodiments, input/output interface 506 includes a display and input devices such as a keyboard, a mouse or a track-pad. In some embodiments, communication buses 510 include circuitry (sometimes called a chipset) that interconnects and controls communications between system components. In some embodiments, memory 504 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 504 includes one or more storage devices remotely located from the one or more processors 502. In some embodiments, memory 504, or alternatively the non-volatile memory device(s) within memory 504, comprises a non-transitory computer readable storage medium.

In some embodiments, memory 504 or alternatively the non-transitory computer readable storage medium of memory 504 stores the following programs, modules and data structures, instructions, or a subset thereof:

- Operating System 512 that includes procedures for handling various basic system services and for performing hardware dependent tasks.
- I/O module 514 that includes procedures for handling various basic input and output functions through one or more input and output devices.
- Communication module 516 that is used for connecting machine 500 to other machines (e.g., other machines 102 in network 100) or servers (e.g., server 108) via one or more network communication interfaces 508 (wired or wireless) and one or more communication networks, such as the Internet, other wide area networks, local area networks, metropolitan area networks, and so on.
- Threat detection module 518 that includes instructions for creating and maintaining local event logs, performing IOC evaluations based on local state, and receiving, re-ordering, and evaluating indicators of compromise, e.g., based on costs, as described with respect to method 400.
- Other modules 520 that include instructions for handling other functions and aspects described herein, such as an orbit formation and maintenance module that includes instructions for self-insertion into a linear communication orbit and self-healing from a broken link in the linear communication orbit, a message and command module that includes instructions for (1) processing and propagating system, security and network management messages and commands (e.g., detection requests, reporting requests, reporting messages, remedial instructions, etc.) (e.g., generation and/or propagation of queries and answers related to IOC evaluations) and/or (2) distribution of files and software updates (e.g., management software); and a remedial action module that include instructions for performing remedial actions.
- Indicator Item Index 522 that stores results for one or more indicator items (e.g., results of evaluating one or more indicator items with respect to a file or set of files, such as files 526).
- IOCs (indicators of compromise) 524;
- Files 526 that include files that store local values for event histories, e.g., results for one or more indicator items (e.g., results of evaluating one or more indicator items with respect to a file or set of files), event artifacts, files having executable programs, image files containing images, and/or data files containing data of various types.

FIG. 5 is merely illustrative of the structures of machines 500. A person skilled in the art would recognize that particular embodiments of machines 500 may include more or fewer components than those shown. One or more modules may be divided into sub-modules, and/or one or more functions may be provided by different modules than those shown.

Figure 6:
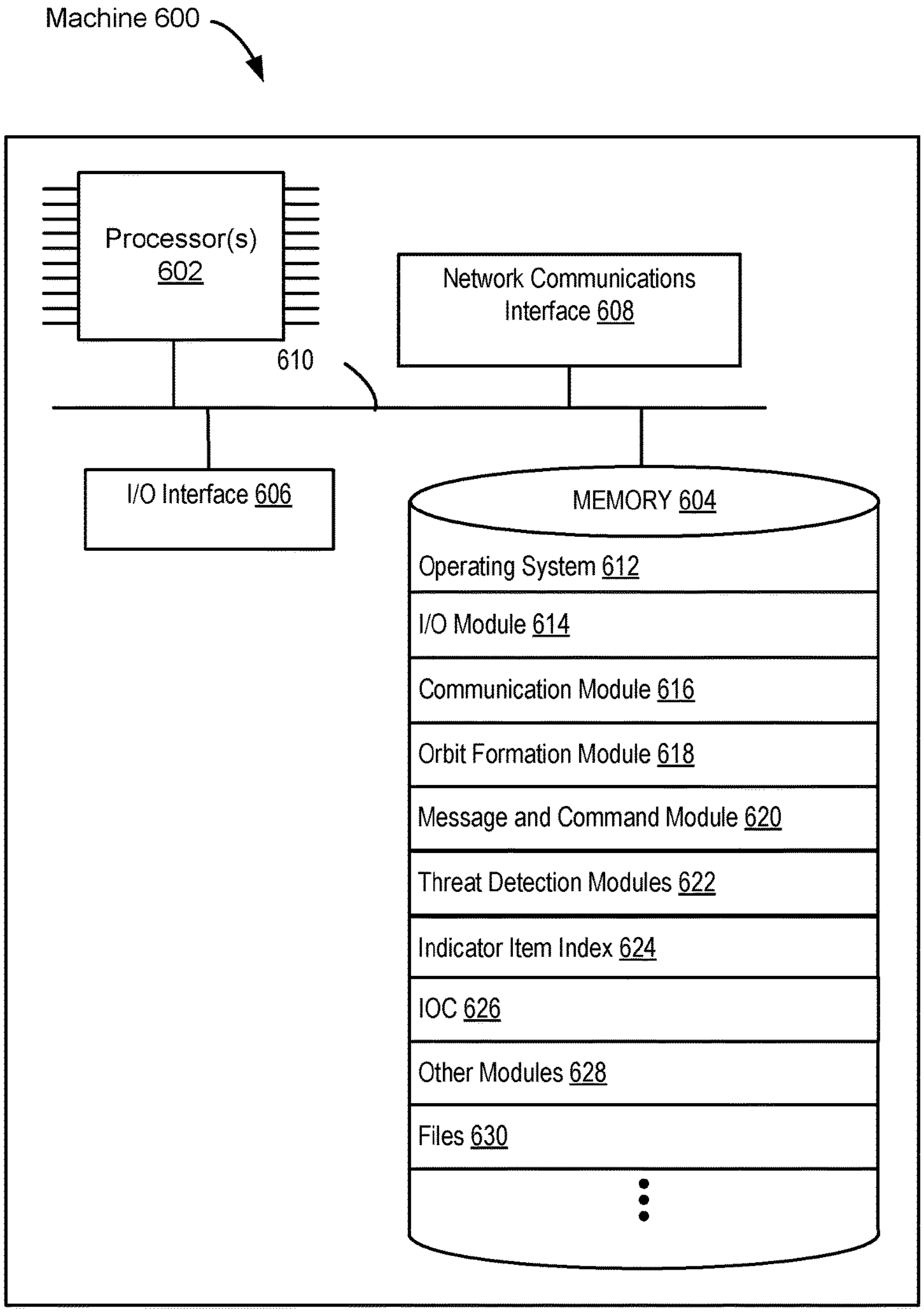
FIG. 6 is a block diagram of a system (e.g., an exemplary server) in a linear communication orbit, in accordance with some embodiments.

FIG. 6 is a block diagram of an exemplary machine 600 (e.g., serving as a server 108 of the network shown in FIG. 1). In some implementations, machine 600 includes one or more processors 602, memory 604 for storing programs and instructions for execution by one or more processors 602, one or more communications interfaces such as input/output interface 606 and network interface 608, and one or more communications buses 610 for interconnecting these components.

In some embodiments, input/output interface 606 includes a display and input devices such as a keyboard, a mouse or a track-pad. In some embodiments, communication buses 610 include circuitry (sometimes called a chipset) that interconnects and controls communications between system components. In some embodiments, memory 604 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604 includes one or more storage devices remotely located from the one or more processors 602. In some embodiments, memory 604, or alternatively the non-volatile memory device(s) within memory 604, comprises a non-transitory computer readable storage medium.

In some embodiments, memory 604 or alternatively the non-transitory computer readable storage medium of memory 604 stores the following programs, modules and data structures, instructions, or a subset thereof:

- Operating System 612 that includes procedures for handling various basic system services and for performing hardware dependent tasks.
- I/O module 614 that includes procedures for handling various basic input and output functions through one or more input and output devices.
- Communication module 616 that is used for connecting machine 600 to other machines (e.g., machines 102 in network 100) or servers (e.g., a remote server) via one or more network communication interfaces 608 (wired or wireless) and one or more communication networks, such as the Internet, other wide area networks, local area networks, metropolitan area networks, and so on.
- Orbit formation module 618 that includes instructions to determine and provide ordinal positions of machines 102 in an ordered sequence of all managed machines 102 currently known to be coupled to network 100.
- Message and command module 620 that includes instructions for (1) providing and collecting system, security and network management messages and commands (e.g., detection requests, reporting requests, reporting messages, remedial instructions, etc.) and/or (2) distribution of files and software updates (e.g., management software). In some embodiments, message and command module 620 provides a user interface for a network or system administrator to directly perform various system and network functions, such as issuing status inquiries, providing management instructions, deploying system configurations, and dispatching software updates, etc.
- Threat detection module 622 that includes instructions for creating and maintaining local event logs, performing IOC evaluations based on local state, and receiving, re-ordering, and evaluating indicators of compromise, e.g., based on costs, as described with respect to method 400.
- Indicator Item Index 624 that stores results for one or more indicator items (e.g., results of evaluating one or more indicator items with respect to a file or set of files, such as files 630).
- IOCs (indicators of compromise) 626;
- Other modules 628 that include instructions for handling other functions and aspects described herein, such as forwarding instructions, queries, requests from an administrator's device and/or a remote investigating server along the linear communication orbit, and forwarding responses and answers collected from the network to the administrator's device and/or the remote investigating server.
- Files 630 that optionally include files that store raw and/or processed data collected from the network, including for example, local values for event histories, event artifacts, results for one or more indicator items (e.g., results of evaluating one or more indicator items with respect to a file or set of files), files having executable programs, image files containing images, and/or data files containing data of various types.

FIG. 6 is merely illustrative of the structures of machines 600. A person skilled in the art would recognize that particular embodiments of machines 600 may include more or fewer components than those shown. One or more modules may be divided into sub-modules, and/or one or more functions may be provided by different modules than those shown.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first widget could be termed a second widget, and, similarly, a second widget could be termed a first widget, without changing the meaning of the description, so long as all occurrences of the "first widget" are renamed consistently and all occurrences of the "second widget" are renamed consistently. The first widget and the second widget are both widgets, but they are not the same widget.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of threat management in a network of machines, the method comprising:

at a device having one or more processors and memory, wherein the device is a server or a client machine within the network of machines, and the device is separated from external networks by one or more firewalls:

receiving respective specifications of a plurality of indicators of compromise (IOCs), wherein the respective specification of each IOC of the plurality of IOCs includes a respective cost associated with evaluating the IOC;

dynamically determining, without requiring user intervention after receipt of the respective specifications of the plurality of IOCs, an order for evaluating the plurality of IOCs based on the respective costs associated with evaluating the plurality of IOCs;

determining whether a threat is present in the network of machines based on results for evaluating one or more of the plurality of IOCs in accordance with the dynamically determined order, instead of an order by which specifications of the plurality of IOCs have been received at the device;

determining modified respective costs associated with the one or more of the plurality of IOCs;

dynamically determining a revised order for evaluating the plurality of IOCs based on the respective costs associated with the plurality of IOCs, including the modified respective costs associated with the one or more IOCs; and determining whether a threat is present in the network of machines based on results for evaluating one or more of the plurality of IOCs in accordance with the revised order.

2. The method of claim 1, wherein determining whether a threat is present based on results for evaluating one or more of the plurality of IOCs in accordance with the dynamically determined order further includes:

evaluating the plurality of IOCs locally in accordance with the dynamically determined order; and determining whether a threat is present when at least one of the plurality of IOCs has been evaluated.

3. The method of claim 1, wherein determining whether a threat is present based on results for evaluating one or more of the plurality of IOCs in accordance with the dynamically determined order further includes:

sending queries into a linear communication orbit comprising a sequence of nodes, to collect IOC evaluation results for the plurality of IOCs in accordance with the dynamically determined order; and determining whether a threat is present when evaluation results for at least one of the plurality of IOCs has been received from the nodes in the linear communication orbit.

4. The method of claim 1, further comprising:

upon detection of a threat, automatically performing one or more remedial actions to address the detected threat.

5. The method of claim 1, including:

receiving user input modifying the respective costs associated with one or more of the plurality of IOCs; and in response to receiving the user input, modifying the respective costs associated with the one or more of the plurality of IOCs.

6. The method of claim 1, wherein dynamically determining an order for evaluating the plurality of IOCs based on the respective costs associated with the plurality of IOCs includes:

ordering the plurality of IOCs based on increasing costs.

7. The method of claim 1, including:

receiving a cost quota for evaluating the plurality of IOCs; and determining which ones of the plurality of IOCs to evaluate based on the cost quota and the dynamically determined order for evaluating the plurality of IOCs.

8. The method of claim 1, including:

determining a respective frequency for evaluating a respective IOC of the plurality of IOCs based on the respective cost associated with the respective IOC and cost criteria received for evaluating the plurality of IOCs.

9. The method of claim 1, wherein a first IOC of the plurality of IOCs includes a plurality of sub-components, and wherein the respective cost associated with evaluating the first IOC includes a sum of respective sub-costs associated with evaluating the plurality of sub-components of the first IOC.

10. The method of claim 1, including:

maintaining an index for looking up local results for one or more indicator items, wherein a cost associated with looking up a local result for a respective indicator item from the index is lower than a cost associated with evaluating the respective indicator item in real-time at the device.

11. The method of claim 10, including:

detecting that one or more of the plurality of IOCs include indicator items present in the index;

wherein determining modified respective costs associated with the one or more of the plurality of IOCs further includes:

in response to detecting that one or more of the plurality of IOCs include at least one indicator item present in the index, modifying the respective costs associated with the one or more of the plurality of IOCs in accordance with the cost for looking up the at least one indicator item in the index.

12. A system of threat management in a network of machines, wherein:

the system is a server or a client machine within the network of machines, and the system comprises:

one or more processors; and memory storing instructions that when executed by the one or more processors cause the processors to perform operations including:

receiving respective specifications of a plurality of indicators of compromise (IOCs), wherein the respective specification of each IOC of the plurality of IOCs includes a respective cost associated with evaluating the IOC;

dynamically determining, without requiring user intervention after receipt of the respective specifications of the plurality of IOCs, an order for evaluating the plurality of IOCs based on the respective costs associated with evaluating the plurality of IOCs;

determining whether a threat is present in the network of machines based on results for evaluating one or more of the plurality of IOCs in accordance with the dynamically determined order, instead of an order by which specifications of the plurality of IOCs have been received at the device;

determining modified respective costs associated with the one or more of the plurality of IOCs;

dynamically determining a revised order for evaluating the plurality of IOCs based on the respective costs associated with the plurality of IOCs, including the modified respective costs associated with the one or more IOCs; and determining whether a threat is present in the network of machines based on results for evaluating one or more of the plurality of IOCs in accordance with the revised order.

13. The system of claim 12, wherein determining whether a threat is present based on results for evaluating one or more of the plurality of IOCs in accordance with the dynamically determined order further includes:

evaluating the plurality of IOCs locally in accordance with the dynamically determined order; and determining whether a threat is present when at least one of the plurality of IOCs has been evaluated.

14. The system of claim 12, wherein determining whether a threat is present based on results for evaluating one or more of the plurality of IOCs in accordance with the dynamically determined order further includes:

sending queries into a linear communication orbit comprising a sequence of nodes, to collect IOC evaluation results for the plurality of IOCs in accordance with the dynamically determined order; and determining whether a threat is present when evaluation results for at least one of the plurality of IOCs has been received from the nodes in the linear communication orbit.

15. The system of claim 12, wherein the operations further include: upon detection of a threat, automatically performing one or more remedial actions to address the detected threat.

16. The system of claim 12, wherein the operations include:

receiving user input modifying the respective costs associated with one or more of the plurality of IOCs; and in response to receiving the user input, modifying the respective costs associated with the one or more of the plurality of IOCs.

17. The system of claim 12, wherein dynamically determining an order for evaluating the plurality of IOCs based on the respective costs associated with the plurality of IOCs includes ordering the plurality of IOCs based on increasing costs.

18. The system of claim 12, wherein the operations include:

receiving a cost quota for evaluating the plurality of IOCs; and determining which ones of the plurality of IOCs to evaluate based on the cost quota and the dynamically determined order for evaluating the plurality of IOCs.

19. The system of claim 12, wherein the operations include:

determining a respective frequency for evaluating a respective IOC of the plurality of IOCs based on the respective cost associated with the respective IOC and cost criteria received for evaluating the plurality of IOCs.

20. The system of claim 12, wherein a first IOC of the plurality of IOCs includes a plurality of sub-components, and wherein the respective cost associated with evaluating the first IOC includes a sum of respective sub-costs associated with evaluating the plurality of sub-components of the first IOC.

21. The system of claim 12, wherein the operations include: maintaining an index for looking up local results for one or more indicator items, wherein a cost associated with looking up a local result for a respective indicator item from the index is lower than a cost associated with evaluating the respective indicator item in real-time at the device.

22. The system of claim 21, wherein the operations include:

detecting that one or more of the plurality of IOCs include indicator items present in the index;

wherein determining modified respective costs associated with the one or more of the plurality of IOCs further includes:

in response to detecting that one or more of the plurality of IOCs include at least one indicator item present in the index, modifying the respective costs associated with the one or more of the plurality of IOCs in accordance with the cost for looking up the at least one indicator item in the index.

23. A non-transitory computer-readable medium storing instructions that when executed by one or more processors cause the processors to perform operations comprising:

receiving respective specifications of a plurality of indicators of compromise (IOCs), wherein the respective specification of each IOC of the plurality of IOCs includes a respective cost associated with evaluating the IOC;

dynamically determining, without requiring user intervention after receipt of the respective specifications of the plurality of IOCs, an order for evaluating the plurality of IOCs based on the respective costs associated with evaluating the plurality of IOCs;

determining whether a threat is present in a network of machines based on results for evaluating one or more of the plurality of IOCs in accordance with the dynamically determined order, instead of an order by which specifications of the plurality of IOCs have been received at the device;

determining modified respective costs associated with the one or more of the plurality of IOCs;

dynamically determining a revised order for evaluating the plurality of IOCs based on the respective costs associated with the plurality of IOCs, including the modified respective costs associated with the one or more IOCs; and determining whether a threat is present in the network of machines based on results for evaluating one or more of the plurality of IOCs in accordance with the revised order.

24. The non-transitory computer-readable medium of claim 23, wherein determining whether a threat is present based on results for evaluating one or more of the plurality of IOCs in accordance with the dynamically determined order further includes:

evaluating the plurality of IOCs locally in accordance with the dynamically determined order; and determining whether a threat is present when at least one of the plurality of IOCs has been evaluated.

25. The non-transitory computer-readable medium of claim 23, wherein determining whether a threat is present based on results for evaluating one or more of the plurality of IOCs in accordance with the dynamically determined order further includes:

sending queries into a linear communication orbit comprising a sequence of nodes, to collect IOC evaluation results for the plurality of IOCs in accordance with the dynamically determined order; and determining whether a threat is present when evaluation results for at least one of the plurality of IOCs has been received from the nodes in the linear communication orbit.

26. The non-transitory computer-readable medium of claim 23, wherein the operations further include: upon detection of a threat, automatically performing one or more remedial actions to address the detected threat.

27. The non-transitory computer-readable medium of claim 23, wherein the operations include:

receiving user input modifying the respective costs associated with one or more of the plurality of IOCs; and in response to receiving the user input, modifying the respective costs associated with the one or more of the plurality of IOCs.

28. The non-transitory computer-readable medium of claim 23, wherein dynamically determining an order for evaluating the plurality of IOCs based on the respective costs associated with the plurality of IOCs includes ordering the plurality of IOCs based on increasing costs.

29. The non-transitory computer-readable medium of claim 23, wherein the operations include:

receiving a cost quota for evaluating the plurality of IOCs; and determining which ones of the plurality of IOCs to evaluate based on the cost quota and the dynamically determined order for evaluating the plurality of IOCs.

30. The non-transitory computer-readable medium of claim 23, wherein the operations include:

determining a respective frequency for evaluating a respective IOC of the plurality of IOCs based on the respective cost associated with the respective IOC and cost criteria received for evaluating the plurality of IOCs.

31. The non-transitory computer-readable medium of claim 23, wherein a first IOC of the plurality of IOCs includes a plurality of sub-components, and wherein the respective cost associated with evaluating the first IOC includes a sum of respective sub-costs associated with evaluating the plurality of sub-components of the first IOC.

32. The non-transitory computer-readable medium of claim 23, wherein the operations include: maintaining an index for looking up local results for one or more indicator items, wherein a cost associated with looking up a local result for a respective indicator item from the index is lower than a cost associated with evaluating the respective indicator item in real-time at the device.

33. The non-transitory computer-readable medium of claim 32, wherein the operations include:

detecting that one or more of the plurality of IOCs include indicator items present in the index;

wherein determining modified respective costs associated with the one or more of the plurality of IOCs further includes:

in response to detecting that one or more of the plurality of IOCs include at least one indicator item present in the index, modifying the respective costs associated with the one or more of the plurality of IOCs in accordance with the cost for looking up the at least one indicator item in the index.

34. A method of threat management in a network of machines, the method comprising:

at a device having one or more processors and memory, wherein the device is a server or a client machine within the network of machines, and the device is separated from external networks by one or more firewalls:

receiving respective specifications of a plurality of indicators of compromise (IOCs), wherein the respective specification of each IOC of the plurality of IOCs includes a respective cost associated with evaluating the IOC;

dynamically determining, without requiring user intervention after receipt of the respective specifications of the plurality of IOCs, an order for evaluating the plurality of IOCs based on the respective costs associated with evaluating the plurality of IOCs;

sending queries into a linear communication orbit comprising a sequence of machines within the network of machines;

collecting IOC evaluation results via the linear communication orbit, from a plurality of machines in the sequence of machines, for the plurality of IOCs evaluated locally at the plurality of machines in accordance with the dynamically determined order; and determining whether a threat is present in the network of machines based on the collected IOC evaluation results, evaluated locally at the plurality of machines in accordance with the dynamically determined order, instead of an order by which specifications of the plurality of IOCs have been received at the device.

35. A system of threat management in a network of machines, wherein:

the system is a server or a client machine within the network of machines, and the system comprises:

one or more processors; and memory storing instructions that when executed by the one or more processors cause the processors to perform operations including:

receiving respective specifications of a plurality of indicators of compromise (IOCs), wherein the respective specification of each IOC of the plurality of IOCs includes a respective cost associated with evaluating the IOC;

dynamically determining, without requiring user intervention after receipt of the respective specifications of the plurality of IOCs, an order for evaluating the plurality of IOCs based on the respective costs associated with evaluating the plurality of IOCs;

sending queries into a linear communication orbit comprising a sequence of machines within the network of machines;

collecting IOC evaluation results via the linear communication orbit, from a plurality of machines in the sequence of machines, for the plurality of IOCs evaluated locally at the plurality of machines in accordance with the dynamically determined order; and determining whether a threat is present in the network of machines based on the collected IOC evaluation results, evaluated locally at the plurality of machines in accordance with the dynamically determined order, instead of an order by which specifications of the plurality of IOCs have been received at the device.

36. A non-transitory computer-readable medium storing instructions that when executed by one or more processors cause the processors to perform operations comprising:

receiving respective specifications of a plurality of indicators of compromise (IOCs), wherein the respective specification of each IOC of the plurality of IOCs includes a respective cost associated with evaluating the IOC;

dynamically determining, without requiring user intervention after receipt of the respective specifications of the plurality of IOCs, an order for evaluating the plurality of IOCs based on the respective costs associated with evaluating the plurality of IOCs;

sending queries into a linear communication orbit comprising a sequence of machines within the network of machines;

collecting IOC evaluation results via the linear communication orbit, from a plurality of machines in the sequence of machines, for the plurality of IOCs evaluated locally at the plurality of machines in accordance with the dynamically determined order; and determining whether a threat is present in the network of machines based on the collected IOC evaluation results, evaluated locally at the plurality of machines in accordance with the dynamically determined order, instead of an order by which specifications of the plurality of IOCs have been received at the device.

* * * * *